US010097914B2

(12) United States Patent
Petrank

(10) Patent No.: US 10,097,914 B2
(45) Date of Patent: Oct. 9, 2018

(54) DETERMINING EARPIECE PRESENCE AT A USER EAR

(71) Applicant: Bugatone Ltd., Tel-Aviv (IL)

(72) Inventor: Noam Petrank, Tel Aviv-Jaffa (IL)

(73) Assignee: Bugatone Ltd., Tel-Aviv (IL)

( * ) Notice: Subject to any disclaimer, the term of this patent is extended or adjusted under 35 U.S.C. 154(b) by 0 days.

(21) Appl. No.: 15/606,374

(22) Filed: May 26, 2017

(65) Prior Publication Data

US 2017/0347180 A1 Nov. 30, 2017

Related U.S. Application Data

(60) Provisional application No. 62/379,160, filed on Aug. 24, 2016, provisional application No. 62/342,872,
(Continued)

(51) Int. Cl.
*H04R 29/00* (2006.01)
*H04R 1/10* (2006.01)
(Continued)

(52) U.S. Cl.
CPC .......... *H04R 1/1041* (2013.01); *G06F 3/165* (2013.01); *G10L 25/51* (2013.01); *H04R 1/1083* (2013.01);
(Continued)

(58) Field of Classification Search
CPC .. H04R 1/1041; H04R 1/1083; H04R 1/1008; H04R 1/1016; H04R 2420/07;
(Continued)

(56) References Cited

U.S. PATENT DOCUMENTS 4,395,739 A    7/1983 Nakazawa et al.
5,787,187 A    7/1998 Bouchard et al.
(Continued)

FOREIGN PATENT DOCUMENTS

CN    2162063    4/1994
EP    2202998    6/2010
(Continued)

OTHER PUBLICATIONS

European Search Report in European Application No. 14792178.7, dated Dec. 1, 2016, 4 pages.
(Continued)

*Primary Examiner* — Xu Mei
*Assistant Examiner* — Ubachukwu Odunukwe
(74) *Attorney, Agent, or Firm* — Fish & Richardson P.C.

(57) ABSTRACT

In general, the subject matter described in this disclosure can be embodied in methods, systems, and computer-readable devices. An audio processing device plays a source audio signal with an electroacoustic transducer of a user earpiece, and records an aural signal that is sensed by same said electroacoustic transducer. The audio processing device determines values of one or more features of the aural signal that indicate a characteristic of a space in which the user earpiece is located. The audio processing device compares the determined values of the one or more features of the aural signal with pre-defined values of the one or more features. Based on a result of the comparing, the audio processing device determines whether the user earpiece is located at a user's ear.

19 Claims, 16 Drawing Sheets

Related U.S. Application Data filed on May 27, 2016, provisional application No. 62/342,871, filed on May 27, 2016, provisional application No. 62/342,869, filed on May 27, 2016.

(51) Int. Cl.
*G06F 3/16* (2006.01)
*G10L 25/51* (2013.01)
*H04S 7/00* (2006.01)
*G01S 15/04* (2006.01)
*H04R 3/00* (2006.01)

(52) U.S. Cl.
CPC ............ *G01S 15/04* (2013.01); *H04R 1/1008* (2013.01); *H04R 1/1016* (2013.01); *H04R 3/00* (2013.01); *H04R 29/001* (2013.01); *H04R 2420/05* (2013.01); *H04R 2420/07* (2013.01); *H04R 2460/03* (2013.01); *H04R 2460/11* (2013.01); *H04S 7/303* (2013.01)

(58) Field of Classification Search
CPC ..... H04R 2420/05; G06F 3/165; G06F 1/163; G10L 25/51; G01S 15/04; G01S 11/06; G02B 27/017
USPC .............................................. 381/74, 58, 59
See application file for complete search history.

(56) References Cited

U.S. PATENT DOCUMENTS

| | | | |
|---|---|---|---|
| 5,990,784 A | 11/1999 | Burnett | |
| 6,385,261 B1 | 5/2002 | Tsuji et al. | |
| 7,065,219 B1 | 6/2006 | Abe et al. | |
| 7,359,504 B1 | 4/2008 | Reuss et al. | |
| 7,773,759 B2 | 8/2010 | Alves et al. | |
| 8,249,265 B2 | 8/2012 | Shumard | |
| 8,750,528 B2* | 6/2014 | Dong | H04R 3/00 381/123 |
| 8,774,875 B1 | 7/2014 | Halferty et al. | |
| 9,305,568 B2 | 4/2016 | Kraft et al. | |
| 9,826,312 B2* | 11/2017 | Chiang | H04R 5/04 |
| 2004/0215968 A1 | 10/2004 | Rodwell et al. | |
| 2008/0044036 A1 | 2/2008 | Konchitsky | |
| 2008/0146890 A1 | 6/2008 | LeBoeuf | |
| 2008/0159555 A1 | 7/2008 | Asada et al. | |
| 2009/0003617 A1 | 1/2009 | Goldman et al. | |
| 2009/0245529 A1 | 10/2009 | Asada et al. | |
| 2010/0145203 A1 | 6/2010 | Kim | |
| 2010/0174390 A1 | 7/2010 | Garrett et al. | |
| 2010/0195842 A1 | 8/2010 | Sibbald et al. | |
| 2010/0246836 A1* | 9/2010 | Johnson, Jr. | H04R 5/04 381/58 |
| 2010/0272276 A1 | 10/2010 | Carreras et al. | |
| 2010/0296666 A1 | 11/2010 | Lin | |
| 2011/0007907 A1 | 1/2011 | Park et al. | |
| 2011/0116643 A1 | 5/2011 | Tiscareno | |
| 2011/0301435 A1 | 12/2011 | Albert | |
| 2012/0250873 A1 | 10/2012 | Bakalos et al. | |
| 2013/0177163 A1 | 7/2013 | Hsiao | |
| 2013/0196721 A1 | 8/2013 | Waterman et al. | |
| 2013/0208908 A1 | 8/2013 | Theiler et al. | |
| 2014/0270208 A1 | 9/2014 | Miller et al. | |
| 2015/0208166 A1* | 7/2015 | Raghuvanshi | H04R 3/002 381/71.6 |
| 2015/0334505 A1* | 11/2015 | Crutchfield | H04S 7/40 381/17 |
| 2015/0355880 A1 | 12/2015 | Kraft et al. | |
| 2015/0373474 A1 | 12/2015 | Kraft et al. | |
| 2015/0382106 A1 | 12/2015 | Kraft et al. | |
| 2016/0063986 A1 | 3/2016 | Ben-Ami et al. | |
| 2017/0055063 A1 | 2/2017 | Ben-Ami et al. | |
| 2017/0070834 A1 | 3/2017 | Ben-Ami et al. | |

FOREIGN PATENT DOCUMENTS

| | | |
|---|---|---|
| EP | 2314212 | 4/2011 |
| EP | 2945399 | 11/2015 |
| WO | WO 2000/10362 | 2/2000 |
| WO | WO 2008/096125 | 8/2000 |
| WO | WO 2008/000304 | 1/2008 |
| WO | WO 2012/167234 | 12/2012 |
| WO | WO 2014/178054 | 11/2014 |
| WO | WO 2015/166482 | 11/2015 |
| WO | WO 2015/177787 | 11/2015 |
| WO | WO 2016/067942 | 5/2016 |

OTHER PUBLICATIONS

International Preliminary Report on Patentability in International Application No. PCT/IL2014/050394, dated Nov. 3, 2015, 5 pages.
International Search Report and Written Opinion in International Application No. PCT/IL2014/050394, dated Jul. 28, 2014, 9 pages.
International Search Report and Written Opinion in International Application No. PCT/IL2015/050430, dated Aug. 2, 2015, 7 pages.
International Preliminary Report on Patentability in International Application No. PCT/IL2015/050430, dated Nov. 1, 2016, 4 pages.
International Preliminary Report on Patentability in International Application No. PCT/IL2015/050525, dated Nov. 22, 2016, 6 pages.
International Search Report and Written Opinion in International Application No. PCT/IL2015/050525, dated Oct. 6, 2015, 8 pages.
International Search Report and Written Opinion in International Application No. PCT/IB2017/053123, dated Aug. 2, 2017, 21 pages.
'Dailymail.co.uk' [online]. "Your ear canal could soon be your password: New system uses sound to analyse the shape of 'unique' cavity," Mar. 2016, [retrieved Oct. 4, 2017]. Retrieved from the internet: URL<http://www.dailymail.co.uk/sciencetech/article-3484262/Your-EAR-canal-soon-password-New-uses-sound-analyse-shape-unique-cavity.html>.
'nec.com' [online]. "NEC develops biometrics technology that uses sound to distinguish individually unique ear cavity shape," Mar. 2016, [retrieved Oct. 4, 2017]. Retrieved from the internet: URL <http://www.nec.com/en/press/201603/global_20160307_01.html>.
'Theguardian.com' [online] "Parrot zik 2.0 review: wireless headphones designed by Phillip Starck," Feb. 2015, [retrieved Oct. 4, 2017]. Retrieved from the internet: URL <https://www.theguardian.com/technology/2015/feb/04/parrot-zik-20-review-wireless-headphones-philippe-starck>.

\* cited by examiner

*Temperature Measurement (First Mechanism)*

$900$

Determine $T$ by determining how recording $r$ is affected, given audio played $s$ and known transformation characteristics $w_0$ and $w_\Delta$.

Figure 6

Perform operations 602-624 of process 600 to solve for $T$, using typical values for $s$
904

Perform portions of process 600 to solve for $T$, but add a high-frequency noise to $s$ Set $s = s_0 + s_{highfreqs}$
908

↓

Calculate $r_{diff} = r - s * w_0$ with revised $s$
910

↓

Calculate $r_\Delta = s_{highfreqs} * w_\Delta$
912

↓

Determine $T$ that minimizes $r_{diff} - T * r_\Delta$
914

906

902

↓

Relative Earpiece temperature ← Combine multiple values for $T$ for a determined time period to determine a representative temperature for that time period
916

DETERMINING EARPIECE PRESENCE AT A USER EAR

CROSS-REFERENCE TO RELATED APPLICATIONS

This application claims the benefit of U.S. Application Ser. No. 62/379,160, filed Aug. 24, 2016, U.S. Application Ser. No. 62/342,872, filed May 27, 2016, U.S. Application Ser. No. 62/342,871, filed May 27, 2016, and U.S. Application Ser. No. 62/342,869, filed May 27, 2016 the contents of which Applications are incorporated herein by reference in their entirety.

BACKGROUND

With the proliferation of mobile computing devices in recent years, users have turned increasingly to earbuds, headphones, and other types of headsets to listen to an increasing supply of audio content made available through these mobile computing devices. Smartphones, for instance, typically include a headphone jack that allows users to connect headsets to the phone, through which a user may listen to songs from a media library or streaming service, podcasts, audio tracks from videos, and a variety of other content sources of the user's preference. Users may also use headsets that include earbuds and an external microphone placed near the user's mouth to hold telephone calls for a hands-free mobile call experience. While listening to audio through a headset of a mobile device (or other computing device), the user may be interrupted by various events that require the user's attention, including ceasing to listen to the audio for a period of time. In some instances, the user may interact with applications or other resources on a device having restricted access. In some instances, the user may attempt to listen to audio content in a noisy environment that makes the audio content difficult for the user to hear.

SUMMARY

This specification generally relates to audio signal processing, including techniques for applying acoustic headsets connected to an audio processing device (e.g., a phone) as a sensor for collecting data that the device can leverage to provide a variety of services to a user. For example, the techniques discussed herein may enable a software platform on a device to utilize off-the-shelf earphones as a powerful, external multi-sensor that can sense characteristics of a user and the user's environment in real-time. Some implementations of the techniques discussed herein include detecting the presence of an earpiece at a user's ear, verifying a person's identity based on acoustic characteristics of a user's ear, performing active noise cancellation using pre-recorded sounds, and calculating temperatures of various environments using a transducer of an earpiece.

The details of one or more implementations are set forth in the accompanying drawings and the description below. Other features, objects, and advantages, will be apparent from the description and drawings, and from the claims.

BRIEF DESCRIPTION OF DRAWINGS

FIGS. 9A-D show a process for determining the temperature of a user and an environment using a transducer.

Like numbers and indicators among the various drawings indicate like elements.

DETAILED DESCRIPTION

This specification generally describes systems, methods, devices, and other techniques for processing audio signals. In some implementations, these techniques may be performed using earpieces (e.g., headphones or earbuds) by using a same electroacoustic transducer in the earpiece to both output, as a speaker, a played audio signal and to sense, as a microphone, an aural signal that can be recorded by an audio processing device. In some examples, an audio processing device can process an audio signal sensed by an earpiece and compare that sensed audio signal to an audio signal that is played at the same time to determine whether the earpiece is currently located at a user's ear. In some examples, an audio processing device can process an audio signal sensed by an earpiece to perform an authentication procedure in which a user's identity is verified based on acoustic characteristics of a user's ear. In some examples, an audio processing device may perform active noise cancellation by detecting a known audio signal that occurs in ambient noise of an environment of a user, and by using a pre-recorded instance of the detected audio signal to modify a source audio signal that a user is listening to through a headset.

Figure 1:
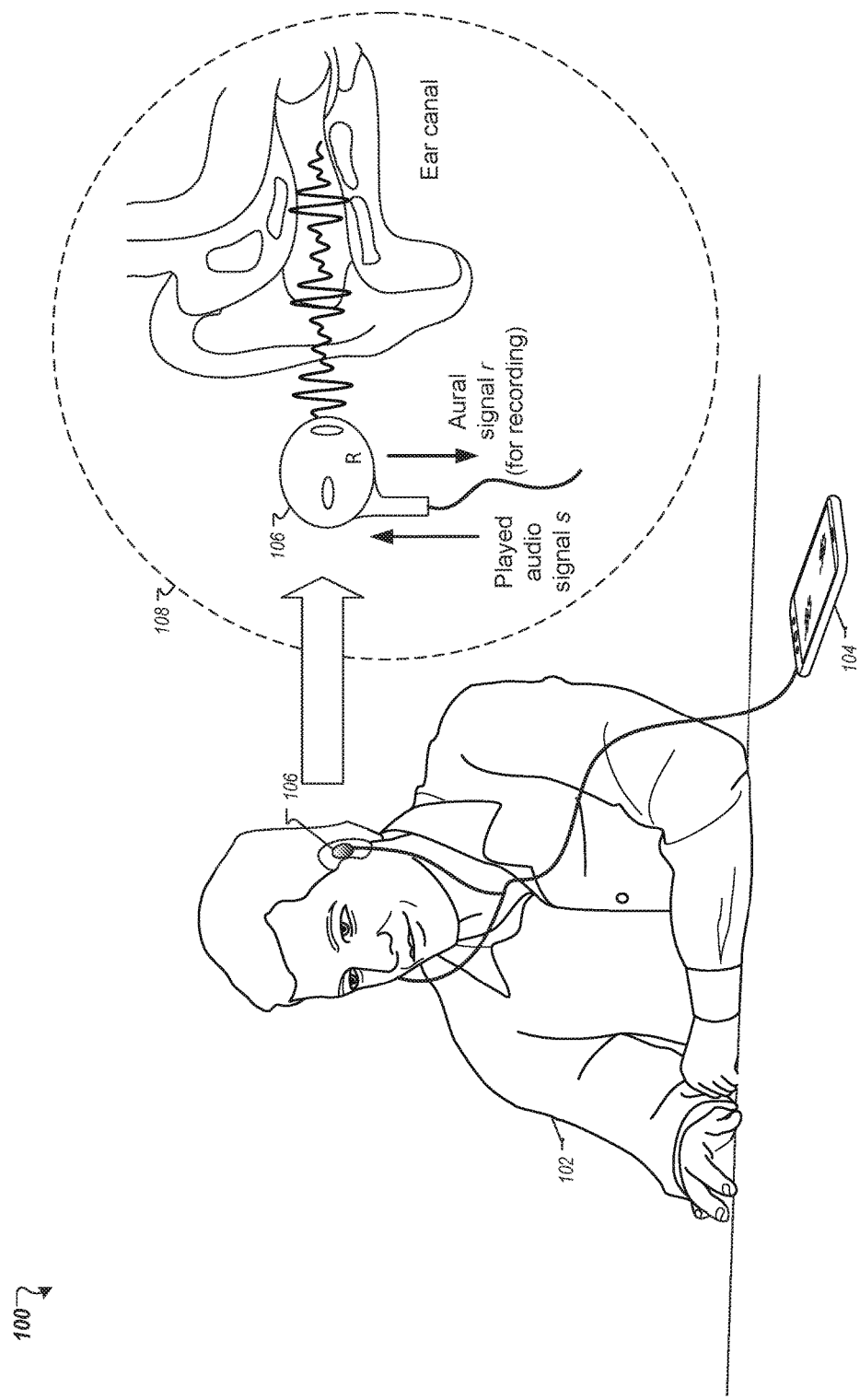
FIG. 1 depicts a conceptual diagram of a user listening to a source audio signal played through a smartphone, using a pair of earbuds. As the source audio signal is played, the earbuds simultaneously function as a microphone to capture an aural signal that results within the user's ear as the audio signal is played.

Referring to FIG. 1, a conceptual diagram is shown of a user 102 listening to a source audio signal s being played through earbuds 106. The source audio signal s is played by an audio processing device 104, which in this example is a smartphone. The earbuds 106 are lodged in the user's ear 106 so as to form an acoustic chamber by which the user 102 can listen to the source audio signal s. The source audio signal s may carry any of a variety of audio content, such as music, speech, a telephone call, or an audio track from a movie, television show, or other video or media content.

As shown in the enlarged area 108, the earbud 106 is capable of both outputting the source audio signal s and sensing an aural audio signal r. In particular, the earbud 106 includes an electroacoustic transducer that converts electrical signals corresponding to the source audio signal s to soundwaves that can be heard by the user 102. By converting the electrical energy to acoustic energy (i.e., soundwaves), the electroacoustic transducer functions as a speaker. However, the electroacoustic transducer is also mechanically sensitive to acoustic energy in its environment, which causes the electroacoustic transducer to vibrate and thereby generate electrical signals. Accordingly, the electroacoustic transducer is also capable of sensing an aural audio signal r, and in some implementations may even output the audio source signal s while simultaneously sensing the aural audio signal r. In some examples, the electroacoustic transducer may include a diaphragm that moves back and forth to generate soundwaves due to pressure imparted on air located in front of the diaphragm. Electrical signals may drive movement of the diaphragm using any of a variety of technologies such as by coils wound around electromagnets or piezoelectric crystals.

Generally, the aural audio signal r is the audio signal that results in a space in which the earbud 106 is located when a source audio signal s is played through the earbud 106. For example, if a microphone were placed adjacent to the earbud 106 while the earbud 106 lodged in the user's ear played a source audio signal s, the signal captured by that microphone would correspond to the aural audio signal r. Of course, the aural signal r would predominantly reflect the source audio signal s played in the space, but it may further reflect other factors such as intrinsic characteristics of the earbud 106 and the unique acoustic properties of the user's ear that at last partially define the space in which the source audio signal s is played. It is noted that, for purposes of illustration, the enlarged view 108 in FIG. 1 shows the earbud located externally of the user's ear, although in practice, the user 102 would typically listen to an audio signal s with the earbud 106 lodged within his or her ear.

In some implementations, the audio processing device 104 may be configured to both play the source audio signal s and to record the aural audio signal r as output and sensed, respectively, by the same electroacoustic transducer of earbud 106. A sound card or other processing circuitry of the audio processing device 104 may be configured to output and record audio signals via a same electroacoustic transducer (e.g., of an earpiece that does include a dedicated microphone distinct from a speaker of the earpiece). For example, an electronic resistance component may be connected between one or more conductors of a circuit that electrically interfaces an earpiece transducer and an audio processing device. The placement of the resistor may form a voltage divider that provides a location in the electrical interface from which an electrical signal corresponding to the aural audio signal r can be sensed and, e.g., digitally sampled and recorded. Processing circuitry of the audio processing device 104 may drive an electrical signal to the electroacoustic transducer for playing a source audio signal s, while simultaneously recording the aural audio signal r. In some implementations, the processing circuitry may switch (e.g., at a high frequency) between alternate modes for playing a source audio signal s and recording the aural audio signal r. The switching may occur at a sufficiently high frequency so that the user 102 does not perceive any disruption in the playing of source audio signal s.

In some implementations, the earbuds 106 may be part of a premium headset that, for example, includes a dedicated microphone. The dedicated microphone may be used, for example, to record an aural audio signal r or to record environmental noise, as may be done for active-noise cancellation, for example. For instance, the dedicated microphone may be an embedded microphone (e.g., 210a, 210b) or an external microphone may be employed (e.g., microphone 212).

Parameter Determination

Various ones of the techniques described herein involve determining parameters associated with audio signals, earpieces, a space in which the earpiece is located (e.g., a user's ear canal), or a combination of these. Some of these parameters are reflected in the following model (Equation 1), which represents an aural audio signal r, as recorded by an audio processing device, as a function of these parameters.

$$r = s*(w0 + T \cdot w\Delta + wa) + e + n \quad \text{(Equation 1)}$$

Note: the * operator denotes convolution

The parameters in the model of Equation 1 generally indicate the following:

TABLE 1

| | |
|---|---|
| r | Digital samples recorded from aural audio signal sensed by earpiece |
| s | Digital samples of source audio signal to be played through earpiece |
| e | Environmental noise that occurs in a space in which the earpiece is located (e.g., background or ambient noise) |
| n | Electrical noise resulting from audio processing circuitry |
| w0 | Model of the electrical echo of the earpiece at baseline temperature $T_0$ (e.g., in Kelvins) |
| wΔ | Model of the temperature-dependent electrical echo of the earpiece |
| wa | Model of the acoustic echo of a space in which the earpiece is disposed |
| T | Temperature difference from $T_0$ |

Thus, the model of Equation 1 indicates that the recorded aural audio signal r is a function of three audio signals: (1)

source audio signal s played by the audio processing device, (2) environmental noise e, and (3) electrical noise n of the audio processing device. However, the source audio signal s may be distorted due to three factors, and this distortion is represented by the convolution of s with $(w0+T \cdot w\Delta+wa)$. The parameters $w_O$ and $w_A$ are intrinsic parameters of the earpiece, and specific to the design of a given earpiece. Thus, an earbud that fits within an ear may have different parameters $w_O$ and $w_A$ values from an earphone that covers an ear. Likewise, a first earbud of a particular model by a particular manufacturer may have different $w_O$ and $w_A$ parameters from a second earbud of a different model by a different manufacturer. These parameters generally indicate how the geometry and overall configuration of an earpiece act to modify (e.g., distort) the audio signal s when played through that earpiece. The $w_O$ parameter indicates how the earpiece modifies an audio signal sat a baseline temperature $T_0$ (e.g., 20 degrees Celsius), while the $w_A$ parameter indicates how the earpiece modifies an audio signal s as a function of a temperature difference from $T_0$.

In general, both $w_O$ and $w_A$ represent a transformation characteristic of the audio signal s imparted by the earpiece independent of a space in which the earpiece is disposed. In some implementations, $w_O$ and $w_A$ each comprise a plurality of values (e.g., tens or hundreds of values) that collectively indicate respective impulse response characteristics of the earpiece. For example, $w_O$ can indicate the impulse response function of the electrical echo of the earpiece, and $w_A$ can indicate the temperature-dependent impulse response function of the electrical echo of the earpiece.

A simplified way of describing the impulse response functions is to imagine the echo that results when an impulse tone is provided to the earpiece. For example, assuming that that the system samples at 1000 Hz, then the system would sample the amplitude of the earpiece voltage every 0.001 seconds. If an impulse tone was output at time 0, the impulse response may record the echoes that the earpiece would hear and that were due to the output of the impulse tone, in this example being recorded as an amplitude measurement every 0.001 seconds. As such, the impulse response may be considered a vector or array of values, one recorded each 0.001 seconds after the playing of the impulse function. This echo can be determined to have a fixed characteristic that is based on the characteristics of the earpiece (e.g., $w_O$) and a variable characteristic that is based on of the earpiece temperature (e.g., $T \cdot w\Delta$).

The echo is also affected by an additional transformation characteristic that represents the acoustic characteristics of the space in which the audio signal is played, such as the user's ear canal (e.g., $w_a$), although this transformation characteristic is described in greater detail later and may be disregarded for certain measurements. Overlooking environmental noise and electrical noise for a moment, it can be seen how the recording r taken using a transducer would be the combination of sound s that was played using the transducer, convolved with multiple impulse responses that indicate how long it takes for that sound to echo back to the transducer for recording (possibly appearing at multiple different times due to different echoes on different surfaces of the user's ear and the earpiece), and how loud that echo is at various times.

Returning now to discuss the transformation characteristics, the intrinsic parameters of the earpiece ($w_O$ and $w_A$) may be pre-defined and stored in a database that stores intrinsic parameters for a plurality of different earpieces. The audio processing device may identify these parameters from the database (e.g., from user input indicating the make and model of his or her earpieces or based on an automatic detection capability). In some implementations, the intrinsic parameters may be calibrated at a factory or laboratory and made accessible to a population of users. In some implementations, the intrinsic parameters may be calibrated by individual users with their respective audio processing devices.

In some implementations, the environmental noise signal e is determined by recording the audio signal that results when the earpiece is located in position and no audio source signal s is played through the earpiece. In some implementations, the environmental noise signal e may be recorded from a signal sensed by a second microphone other than the electroacoustic transducer of the earpiece, such as an external microphone located in the environment of the user of the earpiece. In some implementations, the environmental noise signal e is calculated after the system has determined the temperature T and the acoustic echo parameter $w_a$, since the other variables and constants may be known or already calculated (the circuit board noise N may either be known, or the combination of the environmental noise signal e and the circuit board noise N may be calculated in combination).

The acoustic echo parameter $w_a$ may indicate an acoustic characteristic of a space that the earpiece is located in when playing audio source signal s. For instance, the $w_a$ parameter indicates how the physical space in which the earpiece is disposed imparts distortion on audio signal s, and is generally independent of how the earpiece itself imparts distortion on audio signal s. The size, shape, configuration, and material of the space in which the earpiece is located may all affect the $w_a$ parameter. Accordingly, when the same earpiece plays a source audio signal s in different spaces, the source audio signal s may be distorted in somewhat different ways based on the particular characteristics of the respective spaces. The acoustic echo parameter $w_a$ may be derived when various other values are known, such as the audio source signal s, the aural audio signal r, and the transformation characteristics $w_O$ and $T \cdot w_A$.

As is described in greater detail herein, the acoustic echo parameter $w_a$ may be applied in different contexts, for example, to generate unique acoustic signatures for users based on the configurations of users' ears that form a space for an earpiece, to verify the identity of users, to detect whether an earpiece is disposed in the ear of a user, and to determine a temperature of an earpiece or a space within which the earpiece is located. In some implementations, the acoustic echo parameter $w_a$ can comprise a plurality of values (e.g., tens or hundreds of values) that collectively indicate an impulse response of the space in which an earpiece is located. The impulse response function can thus model the transformation or distortion of audio signal s resulting from the acoustic characteristics of the space in which the earpiece is located.

Figure 6:
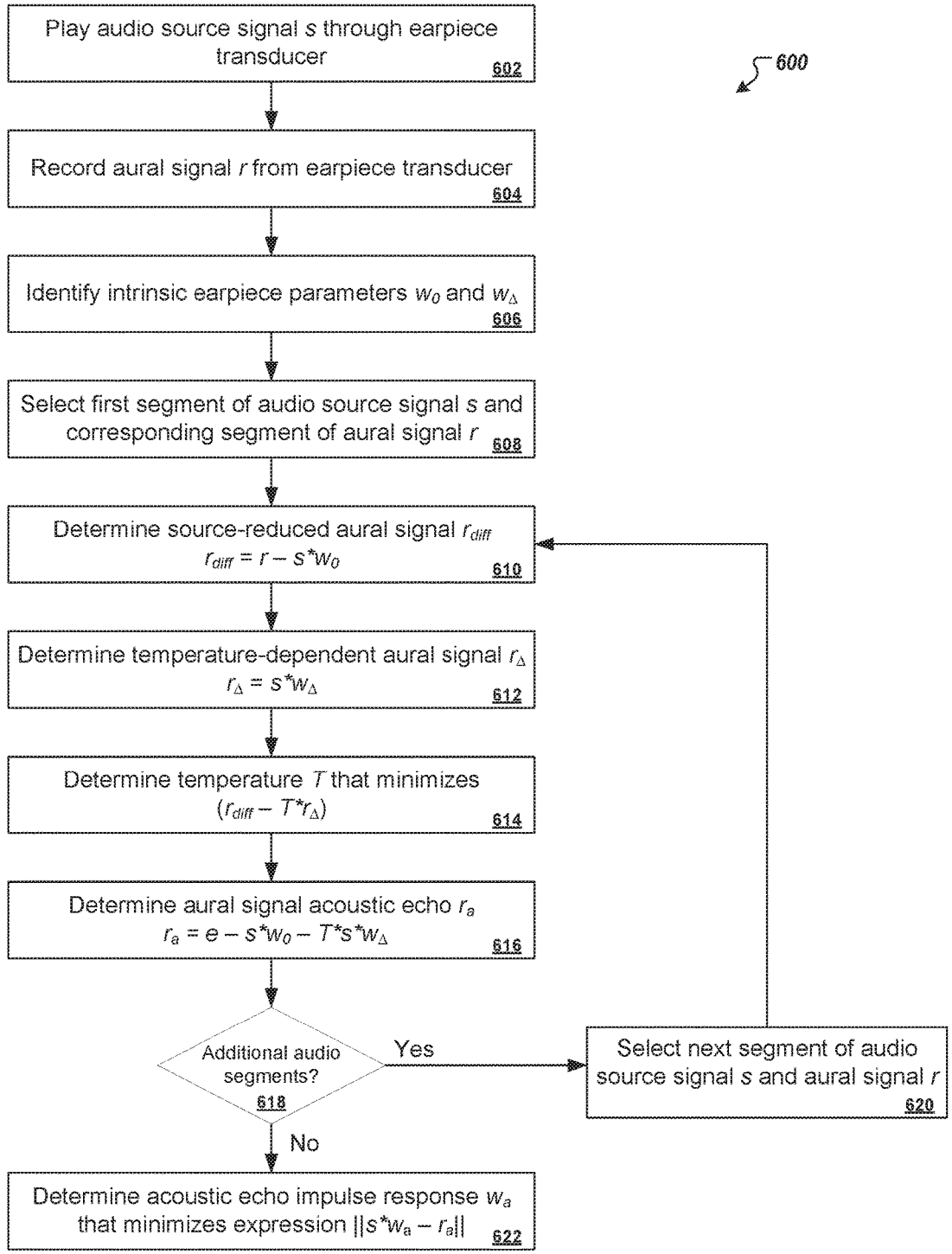
FIG. 6 is a flowchart of an example process for determining the impulse response of an acoustic echo ($w_a$) of a space in which an earpiece is located, e.g., for generating an acoustic signature of a user, detecting the presence of an earpiece at a user's ear, or authenticating a user.

In some implementations, an audio processing device may determine values for the temperature T and the acoustic echo parameter $w_a$ by solving Equation 1 for the values, once other relevant parameters have been identified. An example process 600 for determining or solving for T and $w_a$ using the above-described Equation 1 is represented in the flowchart of FIG. 6. In some implementations, the process 600 may be performed by an audio processing device using conventional earpieces (e.g., earbuds or earphones) having an electroacoustic transducer to output and sense audio signals. To derive T and $w_a$ for a given space, the earpiece is located in that space while an audio source signal s is played through the earpiece (stage 602) and while an aural signal r is recorded from electrical signals generated by the earpiece transducer (stage 604). For example, a user could prompt determination of the acoustic echo parameter $w_a$ for one of the user's ears by placing the earpiece in position at the user's ear and selecting a control on the audio processing device that initiates performance of the process 600. In some cases, the values of $w_a$ may depend in part on a position and orientation of the earpiece in a space, and so the user may take care to locate the earpiece at or near a desired position in the space for determination of the $w_a$ parameter. In some implementations, a space may be associated with multiple sets of values for the $w_a$ parameter, each set corresponding to a different position of the earpiece in the space.

At stage 606, the audio processing device identifies the intrinsic earpiece parameters $w_0$ and $w_\Delta$. These may be calibrated locally on the audio processing device, stored on the audio processing device, or obtained from a computing system remote from the audio processing device (e.g., an Internet-based server system). The audio processing device may identify values for the intrinsic parameters that specifically apply to the earpiece worn by the user. These values may not change based on position of the earpiece or location of the earpiece in a space.

At stage 608, the audio processing device selects a first segment of the audio source signal s and a corresponding segment of the aural signal r for processing in an initial iteration. The selected segment of the aural signal r corresponds to the first segment of the audio source signal s in that the selected segment of r indicates the aural signal that occurred during a same period of time in which the first segment of audio signal s was played and output into the space by the electroacoustic transducer of the earpiece. For example, if the system is playing and recording audio at 1000 Hz, the selected r and s segments may include the voltage of the played signal and the voltage of the recorded signal over a 0.001 second interval of time or recorded every 0.001 seconds.

At stage 610, the audio processing device determines a source-reduced aural signal $r_{diff}$. The source-reduced aural signal $r_{diff}$ can be computed by subtracting, from the selected segment of recorded aural signal r, the convolution of the selected segment of the audio source signal s and $w_0$ (i.e., rdiff=r−s*w0). As may be apparent from analyzing Equation 1, rdiff represents the portion of the recorded sound that excludes the $w_0$ effect of the earpiece on the recording.

At stage 612, the audio processing device determines the temperature-dependent aural signal $r_\Delta$ as the convolution of the selected segment of the audio source signal s and $w_\Delta$ (i.e., r$\Delta$=s*w$\Delta$). As may also be apparent from analyzing Equation 1, $r_\Delta$ represents the portion of the recorded sound that excludes the $w_0$ effect of the earpiece on the recording.

At stage 614, the audio processing device can then determine a temperature T (either an absolute temperature T or a temperature that represents an offset from the baseline temperature $T_0$). This temperature T can be determined by identifying a value for T that minimizes the difference between $r_{diff}$ and the convolution of T and $r_\Delta$ (i.e., T=argmin$_T$ ($r_{diff}$−T*r$\Delta$)). In some implementations, the value of T that minimizes this expression can be determined using a minimum least squares estimation technique. The identified value of T can be the determined temperature of the earpiece. As may be apparent from analyzing Equation 1, this identification of T does not account for the effect on the recorded signal that $w_a$, e, an d N may impart. This may be because $w_a$ may be assumed to be optimal and e and N may have negligible effect on the identification of T during the initial determination of various coefficient values.

At stage 616, upon determining a value for T (stage 614), the audio processing device then determines values for the aural signal acoustic echo $r_a$. The aural signal acoustic echo is generally the component of the recorded aural signal r that results from audio played by the earpiece, and is the distortion imparted on the audio source signal s as a result of the acoustic characteristics of the the earpiece (e.g., not accounting for $w_a$, e, and N. The aural signal acoustic echo $r_a$ can be computed by identifying the recorded signal r, and subtracting from it (1) the convolution of the selected segment of the audio source signal s and $w_0$ and (2) the convolution of T, the selected segment of the audio source signal s and $w_\Delta$ (i.e., ra=r−s*w0−T*s*w$\Delta$).

In practice, the values of T, and thus of $r_a$, tend to change rapidly. An earpiece may warm up, for example, the longer it is lodged in a user's ear, or based on increasing intensity of the source audio signal s during different segments of the song or as a result of the user increasing volume for playing the source audio signal s. To account for these rapidly changing values, the process 600 may determine a new value of T and $r_a$ for each of multiple small segments of the audio source signal s and the recorded aural signal r before computing the values of the acoustic echo parameter $w_a$. For example, T and $r_a$ may be calculated for small segments of r and s (e.g., between 0.05 and 2 seconds), and then $w_a$ calculated after a longer time has passed (e.g., 2-10 seconds) based on values determined from multiple segments. These values may be averaged or otherwise combined at stage 622. In some implementations, the values of $w_a$ can be recalculated every 0.2 seconds (i.e., the size of the interval of $r_a$ every 0.2 seconds). In some implementations these intervals for calculating $w_a$ can be even smaller, such as every 0.05 or 0.1 seconds. The values of $r_a$ calculated at each interval can be combined by concatenation, i.e. by dividing $r_{diff}$ into different segments, finding the corresponding value of T for each segment, calculating $r_a$ and concatenating them. If additional segments of the source signal s and aural signal r remain to be processed before determining $w_a$ (stage 622), then at stage 620 the audio processing device selects the next segment of the signals s and r and returns to stage 610 for additional iterations. The process 600 may continue these iterations until a threshold number of iterations has passed or until another condition is satisfied.

At stage 622, the audio processing device then determines the value of the acoustic echo parameter $w_a$. In some implementations, the value of $w_a$ can be computed as the value that minimizes the expression $\|s*wa−ra\|$. The values that minimizes this expression may be determined using various techniques, such as minimum least squares estimation. As may be apparent from analyzing Equation 1, the determination of the acoustic echo parameter $w_a$ may not account for the values of e and N.

Once T and $w_a$ have been calculated, e and N may be computed. The system may wait a determined amount of time before performing such a computation, in order to let the temperature of the earpiece level out (e.g., at least 5 or 10 seconds). At this point, all other values of Equation 1 may be known, and the combination of e and N may be calculated. It may be possible to separate the value for e from the value for N if the system can determine characteristics of either signal (e.g., using another microphone to record a variation of e that is common to both recordings).

Referring back to FIG. 2A, a block diagram is shown of an example audio processing device 202 that may be configured to perform operations of the various methods described herein. The device 202 may be, for example, a portable media player, a smartphone, a tablet computing device, a wearable computing device, a notebook or desktop computer, a television, or other types of computing devices that generally are capable of playing, recording, and processing audio signals.

The device 202 includes an audio processor 220 having a player 222 for playing audio source signals and a recorder 224 for recording signals sensed by a microphone 212. An earset 204 having a pair of earpieces 206a and 206b (including respective electroacoustic transducers 208a, 208b and optionally separate microphones 210a, 210b) may connect to the audio processing device 202 via port 226 (e.g., a standard 3.5 mm audio jack). The earset 204 may be a conventional, off-the-shelf device that does not have a dedicated microphone built into the earpiece. In some implementations, the earset 204 may be a specialized device that, for example, includes built-in microphones 210a, 210b. In some implementations, the audio processing device 202 may include a controller 218 that coordinates operations performed by the device; an authentication engine 228 that performs aural-based authentication of users; an acoustic modeling engine 238 that generates values of acoustic echoes $w_a$ and acoustic signatures for users; an external noise detector 236 for identifying ambient sounds and the occurrence of pre-recorded audio signals in the ambient sounds; and a noise cancellation engine 240 for performing active noise cancellation using information about pre-recorded audio signals identified by the external noise detector 236. The device may further include a communications interface 242 that communicates over a network 216 with a server 214, e.g., to identify pre-recorded sounds and to obtain pre-stored models of acoustic echoes $w_a$. In some implementations, the audio processing device 202 may have fewer than all of these components, or may include only particular combinations or subsets of these components. As an illustration, in those examples in which the earphones are connected to the audio processing device via a BLUETOOTH or other wireless connection, at least some of the audio processing may be performed by circuitry at the headphones (e.g., the codec, the digital-to-analog output conversion, and the input analog-to-digital conversion may be performed at the headphones). The external microphone 212 may also be connected directly by permanent hard-wire connection to the audio processing circuitry in the headphones, rather than being connected to the audio processing device 202 through a permanent hard-wire connection (e.g., not through a releasable 3.5 mm audio jack). The details of operations performed by the audio processing device 202 are described in the following sections.

Configuring Simultaneous Playing and Recording

A system can use a single transducer to both play and record audio. By way of example, a transducer in an off-the-shelf earset may be positioned so that it produces sound directed toward the ear canal, and so using that transducer also as a microphone may be useful given its orientation toward the ear canal to receive sound, as will be understood in view of intended applications for the technology described in this document that are described below. The use of an earset transducer to both play and record audio may be accomplished by either alternating between the playing and recording functions, or by playing and recording at the same time. In the former, the sound card output port and the sound card input port may be both connected to the transducer, and the sound card may alternate between outputting a signal to the transducer and recording a signal that is generated by the transducer, for example, by repeatedly playing audio for 200 mS and then recording audio for 10 mS.

Figure 2A:
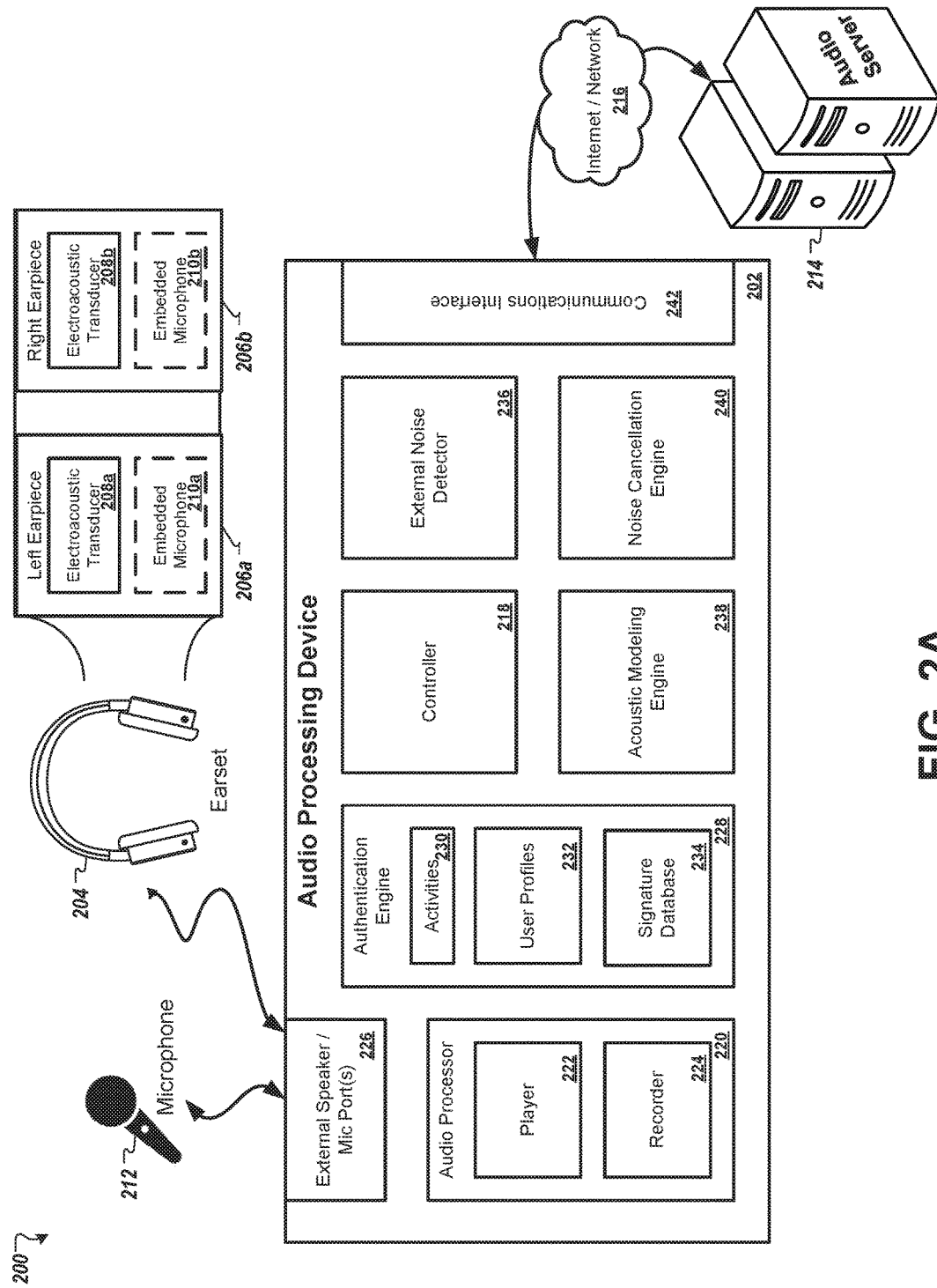
FIG. 2A is a block diagram of an example audio processing device that is configured to carry out various ones of the techniques described herein.
Figure 2B:
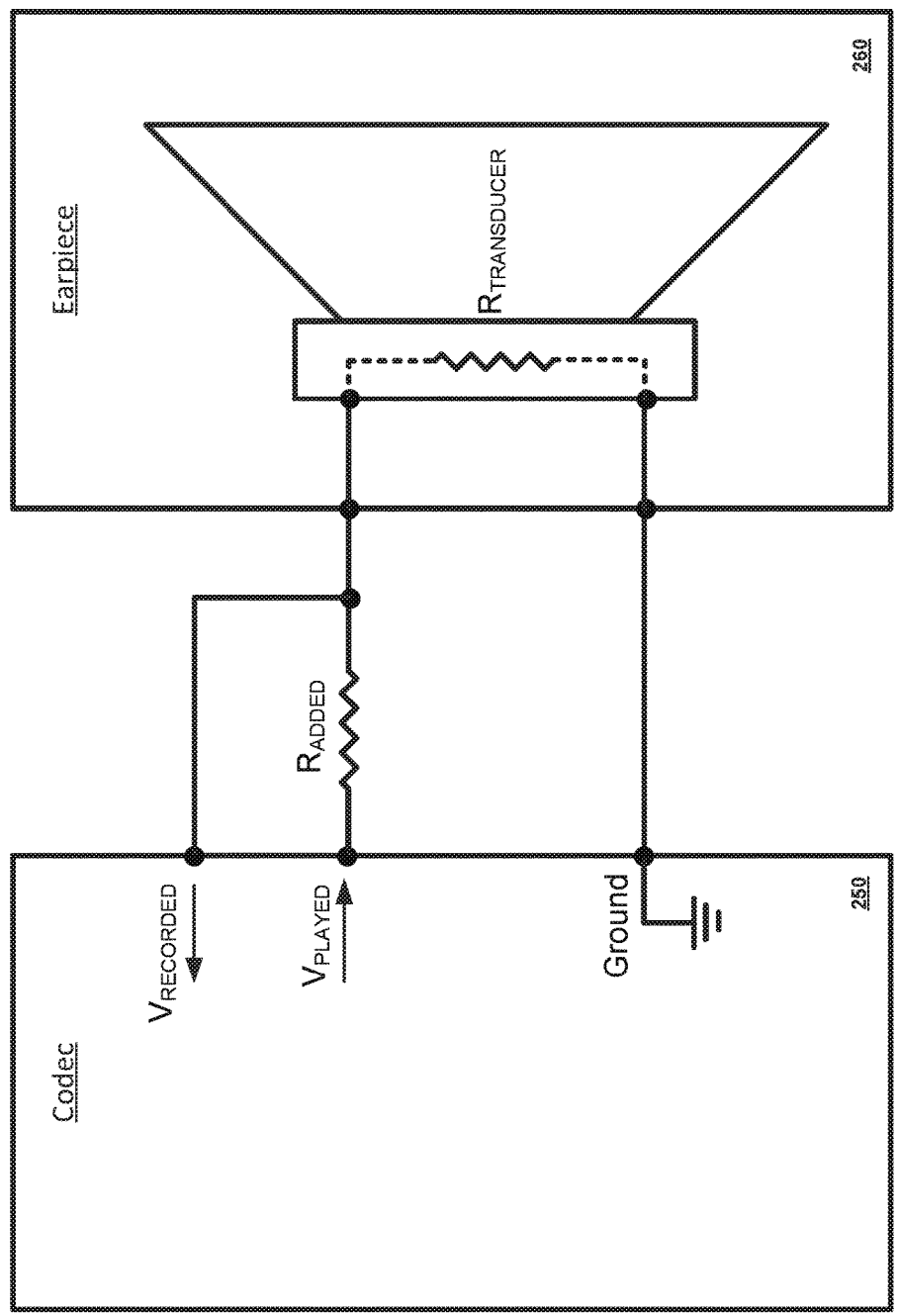
FIG. 2B is a schematic that illustrates a configuration between a coding/decoding component (commonly referred to as a "codec") and an earpiece for simultaneous playing and recording using a transducer of the earpiece.

Regarding the second option, it is possible to both play and record audio at the same time. Doing so enables a computing system to analyze differences between the played audio and the recorded audio, which can be helpful because it allows a computing system to determine characteristics of the environment in which the audio was played (e.g., a temperature of the environment, sounds from the environment, and audio-reflective characteristics of the environment, such as shape). To enhance simultaneous playing and recording of audio, however, it is helpful to modify the typical standard connection between the earpiece transducer and the sound card (e.g., the sound card codec). The modification can include inserting a resistor between the transducer and either the audio circuit output or input. In effect, this insertion may be the same as inserting the resistor between the audio circuit output and input ports. This inserted resistor is illustrated in FIG. 2B as $R_{ADDED}$. Before discussing the benefits provided by the addition of this resistor, this disclosure provides a brief, and somewhat simplified, overview of transducer operation.

Referring now to FIG. 2B, the figure shows a codec 250 on the left, which represents the circuitry that can output an electrical signal to a transducer (e.g., through the $V_{PLAYED}$ output port) and that can input/analyze an electrical signal received from the transducer (e.g., through the $V_{RECORDED}$ input port). The codec may be located in a mobile device (e.g., a phone) or may be located in the headset (e.g., in the circuitry of Bluetooth-connected earphones). To the right of the figure is an earpiece 260 which includes a transducer. In this example, both the $V_{PLAYED}$ and $V_{RECORDED}$ ports are connected to the transducer which is being used both in a speaker configuration and a microphone configuration. This contrasts with a typical operation which would involve one of the $V_{RECORDED}$ port or $V_{PLAYED}$ port being connected to the transducer by itself, depending whether the transducer was to be used as a speaker or a microphone.

When the transducer is connected as a speaker to the $V_{PLAYED}$ port of the audio circuitry, the transducer moves to create sound waves according to the voltage that is output at $V_{PLAYED}$. Some discussion regarding the construction and functioning of a typical audio transducer may be helpful to explain how sound is created and recorded, and how the configuration described herein enhances simultaneous playing and recording of audio. One of the main components of a typical transducer is the cone. This is the portion of the transducer that moves back and forth to create sound waves and is what is seen when viewing the front of a speaker. It can be made of various flexible materials such as paper, paper composites and laminates, or plastic materials. The fixed frame of the speaker within which the cone moves is called a basket, and the cone is connected to the basket by a gasket around the edges, which may also be a paper, plastic, or rubber material. At the center of the cone is the coil, which is typically connected to the backside of the cone and is not visible when viewing a speaker from its front. The coil is connected to the cone and can move forward and backward with the cone because the center of the cone at which the coil is connected may be suspended in space (the cone is only connected at its outer circumference). Surrounding the coil, but separated by air, is an electromagnet that is fixed to frame. Applying voltage to the electromagnet can induce an electrical field to cause the coil to attract to the electromagnet. Because the electromagnet may be displaced from the coil, inducing an electrical field may cause the coil to move forward and backward. As such, applying voltage to the electromagnet affects the position of the cone that is connected to the coil. Still, a given voltage may not necessarily correspond to a fixed position of the cone, because the cone may have biasing forces imparted on it by the gasket and flexing properties of the cone. In practice, the voltage or audio signal is typically oscillating to represent the various frequencies that output through movement of the transducer, and the history of voltages applied to the transducer affects its positioning. In this example, the voltage would be provided to the transducer by the audio circuitry through the $V_{PLAYED}$ port.

The position of the transducer, however, is not entirely set by the voltage provided at the $V_{PLAYED}$ port. Indeed, imagine a user pressing on the cone while the transducer is playing audio, or a shock wave hitting the transducer. In both these situations, the position of the cone deviates from that that would be expected without the any external influence. Moreover, the movement of the cone due to any external influences affect the voltage over the electromagnet. Indeed, just as a generator works by moving a component with respect to an electromagnet to induce a voltage signal across that electromagnet, moving the cone and coil of a transducer can induce voltage and an electrical signal across the terminals of an electromagnet. In fact, this is how the circuit that is shown in FIG. 2B could function as a recording device—if the earpiece/transducer was connected only to the $V_{RECORDED}$ port (not the $V_{PLAYED}$ port). In such an example, the pressure waves (e.g., sounds) hitting the transducer would be converted to a voltage by the electromagnet, which would be supplied to the $V_{RECORDED}$ port to enable the codec to sample the changing voltage values at that port and output a digital data stream that represents the sound recorded by the transducer.

As such, it can be seen how connecting the $V_{PLAYED}$ or $V_{RECORDED}$ ports to the transducer, at least one at a time, can enable playing audio or recording audio using that transducer. Connecting both at the same time to the transducer, however, may not be effective, because then the $V_{PLAYED}$ and $V_{RECORDED}$ may be shorted together and would be driven to the same voltage (e.g., through connection with a conductor of a resistance less than 0.1, 0.5, or 1 ohms). Introducing a resistor connected between the $V_{PLAYED}$ and $V_{RECORDED}$ ports (e.g., with a resistance of at least 2, 5, 10, 50, or 100 ohms) and then connecting the transducer directly to one of the $V_{PLAYED}$ and $V_{RECORDED}$ ports (e.g., again with a conductor of the above-described resistance values) allows voltages at the $V_{PLAYED}$ and $V_{RECORDED}$ to differ, enabling $V_{RECORDED}$ to sense how the voltage across the transducer voltage differs from that at $V_{PLAYED}$. In this example, the placement of the resistor is illustrated as being placed between the $V_{PLAYED}$ port and the transducer, with the $V_{RECORDED}$ port being directly connected to the transducer, although alternatively the resistor could also be added to the $V_{RECORDED}$ line and $V_{PLAYED}$ could be connected directly to the transducer.

The addition of the $R_{ADDED}$ resistor allows the voltage at $V_{RECORDED}$ to differ from that present at $V_{PLAYED}$. Since $V_{RECORDED}$ is connected between the transducer and ground, just as with the transducer, $V_{RECORDED}$ is thus able to sense the voltage of the transducer. For example, assume that 5V is present at $V_{PLAYED}$ and the voltage across the transducer would be expected to be 4V due to the voltage division between $R_{ADDED}$ and $R_{TRANSDUCER}$. Should the voltage across the transducer differ from 4V due to movement of the transducer that is influenced by external sounds, for example, with the voltage being 4.1V, $V_{RECORDED}$ will measure this voltage. A computing system is then able to determine that there was a 0.1 V deviation from the expected voltage 4V and the measured voltage at a moment in time. Regularly performing this determination, a computing system can extract the relatively-small, but time-varying signal of the components of the recorded signal $V_{RECORDED}$ that differ from the $V_{PLAYED}$ signal.

In some examples, inserting $R_{ADDED}$ into the circuit may not significantly affect the performance of the transducer, but may lower the amplitude of the voltage provided to the transducer or the voltage recorded at $V_{RECORDED}$, depending whether the resistor is placed on at the $V_{PLAYED}$ port or the $V_{RECORDED}$ port, respectively. This reduction may similarly reduce the sound volume output by the transducer or the volume of the recording. As such, the computing system may be configured to switch the $R_{ADDED}$ resistor in and out of the circuit, for example, only switching the resistor into the circuit when the computing system has been instructed to simultaneously play and record audio. When the resistor is switched out of the circuit, the earpiece port may be connected directly to the appropriate $V_{PLAYED}$ or $V_{RECORDED}$ port with a conductor of minimal resistance, as described above. The computing system may at the same time open a switch that connects $V_{RECORDED}$ to the earpiece, so that $V_{PLAYED}$ and $V_{RECORDED}$ are not shorted together with $R_{ADDED}$ removed.

In some examples, the $V_{RECORDED}$ port may be a port that is typically designated for dedicated microphones (e.g., the microphone that dangles from headphones on the cord intended to capture the user's voice). As such, the computing system may be configured to switch the $V_{RECORDED}$ port to being connected to the same transducer as the $V_{PLAYED}$ port when the computing system has been instructed to simultaneously play and record audio over a single transducer. As such, when headphones may be in their typical operation, the computing system may leave the $V_{RECORDED}$ port open or connected to a different microphone. In such examples, the computing system is able to use a dedicated microphone when available or desired, and can use the same transducer as a speaker or microphone when a dedicated microphone is not available or when it is desirable to use the same transducer for both playing and recording audio.

Figure 2C:
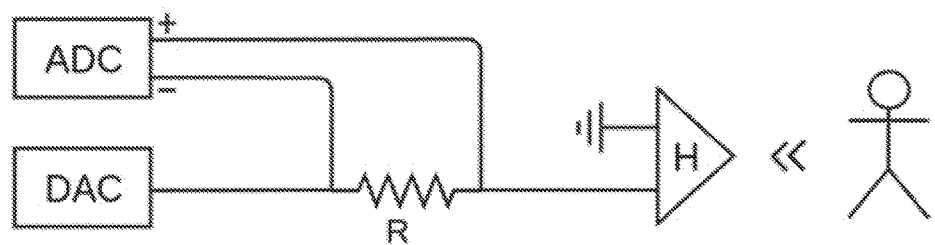
FIG. 2C is a schematic that illustrates another configuration between a coding/decoding component and an earpiece for simultaneous playing and recording using a transducer of the earpiece.

Referring now to FIG. 2C, the figure shows a schematic with an ADC (analog-to-digital converter) and DAC (digital-to-analog converter) to the left, and a representation of a headphone for a user at the right. Connected between the two is a resistor R. This schematic is similar to that shown in FIG. 2C, with the DAC representing $V_{PLAYED}$, the ADC representing $V_{RECORDED}$, R representing $R_{ADDED}$, and H representing $R_{TRANSDUCER}$ (the ground connection of the codec is not represented in FIG. 2C). A primary difference from the schematic in FIG. 2B is that the ADC includes a positive and a negative terminal that are connected across the resistor R, rather than the ADC connecting to just the earpiece side of resistor R. This configuration may be used in codecs that include differential ADCs with positive and negative terminals, and may represent a differential circuit in which the ADC is able to measure the voltage difference over the resistor R. Such a configuration may provide increased dynamic range in comparison to the configuration that is shown in FIG. 2B, in some implementations. The processing by the codec or another computational device may be similar to that performed by the schematic in FIG. 2B. For example, the voltage over the resistor R may differ from that expected for a given output provided by the DAC, due to pressure waves changing the resistance of the headphone earpiece H. The codec (or another computational device) may be able to determine the effect of these pressure waves on the headphone earpiece by comparing the expected and actual measurements across the resistor R by the ADC.

Figure 2D:
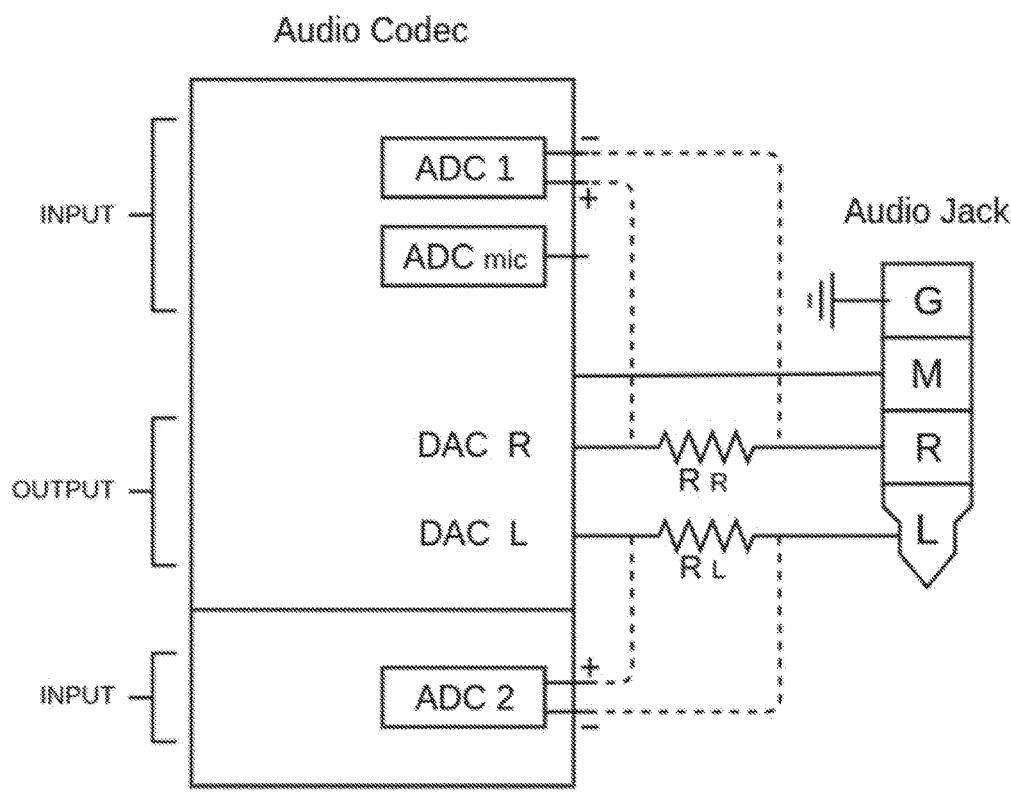
FIG. 2D is a schematic that illustrates a configuration between a coding/decoding component and two earpieces for simultaneous playing and recording using transducers of the earpieces.

Referring now to FIG. 2D, the figure shows a schematic with two ADCs, two DACs, and two resistor Rs. This schematic is similar to that presented with respect to FIG. 2C, but shows a two-channel implementation (left and right channels) rather than a one-channel illustration. In short, each channel has its own DAC outputting an audio signal to its respective channel, its own resistor R between the DAC and the corresponding input terminal to the audio jack that goes to the user earpiece (or the wire that goes to the corresponding transducer in wireless implementations that do not include audio jacks), and its own ADC to measure the differential across the resistor R. In this example, there is also an ADC for the microphone input, for example, for a microphone that may be located inline the cord between the audio jack and the earpieces. This particular audio codec may have extra ADC inputs that are available for use to measure the voltage across the resistors $R_R$ and $R_L$. The ADC positive and negative inputs are reversed in comparison to those in FIG. 2C, but differential circuits may be configured with the positive and negative ACD inputs in differing configurations in circuits.

Aural-Based User Authentication

Figure 3:
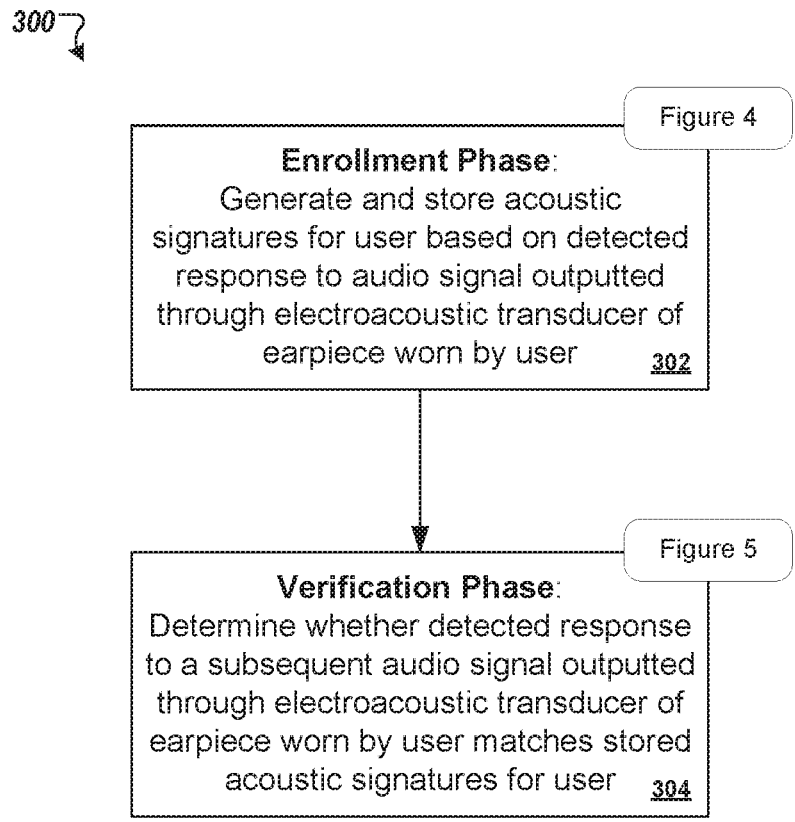
FIG. 3 is a flowchart of an example process for authenticating a user based on acoustic characteristics of a user's ear. The process involves (i) an enrollment phase in which an acoustic signature is generated for a specific user and registered with the user's account, and (ii) a verification stage in which a user's identity is verified based on comparison of features from an aural signal associated with a user to acoustic signatures that are registered with the user's account.

In some implementations, audio signals played and recorded through one or more electroacoustic transducers of an earpiece may be used to implement an authentication capability that can verify identities of users. Authentication can broadly be divided in two principal phases: (i) enrollment and (ii) verification. These phases are represented in the flowchart of FIG. 3. During the enrollment phase (302), a user interacts with an audio processing device to generate one or more acoustic signatures that are registered with a user's account. An acoustic signature is like a unique fingerprint associated with a user, e.g., resulting from unique geometries of the user's ear canal that provides distinct acoustic characteristics. During the verification phase (304), the audio processing device determines whether features of an aural signal at the user's ear matches an acoustic signature associated with the user (e.g., registered with a user's account), and triggers different actions based on whether a match is determined that verifies the user's identity.

For example, when a user arrives at a login page of a banking website, the user's computing device may automatically perform the aural authentication procedure discussed herein to verify the user's identity in lieu of the user typing credentials into the page. If the user is authenticated, the user may be permitted to log into a portal for a banking account associated with the user.

Aural-based authentication is not limited to single, discrete instances of authentication, however (e.g., a one-time verification of a user's identity to determine whether to grant a user access to a restricted site). In some implementations, the aural techniques discussed herein can be used to continuously and repeatedly authenticate a user over time, e.g., during the course of a restricted activity. For example, while the user is logged into a portal for his or her personal banking account, the user may wear a headset that locates a pair of earpieces at the user's ears. As the user interacts with the banking site, the device may play and record sounds through the headset according to, e.g., process 500 of FIG. 5, to monitor the user's status and continuously verify that an authorized user is present while the banking site is open on the device. If the user removes the headset, the authentication procedure can determine that the authorized user is no longer present and can automatically cause the device to log out of the site, thereby ensuring that a non-authorized user cannot hijack the authorized user's account. In some implementations, if authentication fails, the site may prompt the user to confirm his or her identity or may automatically log the user out of the site immediately or after a defined delay.

Figure 4:
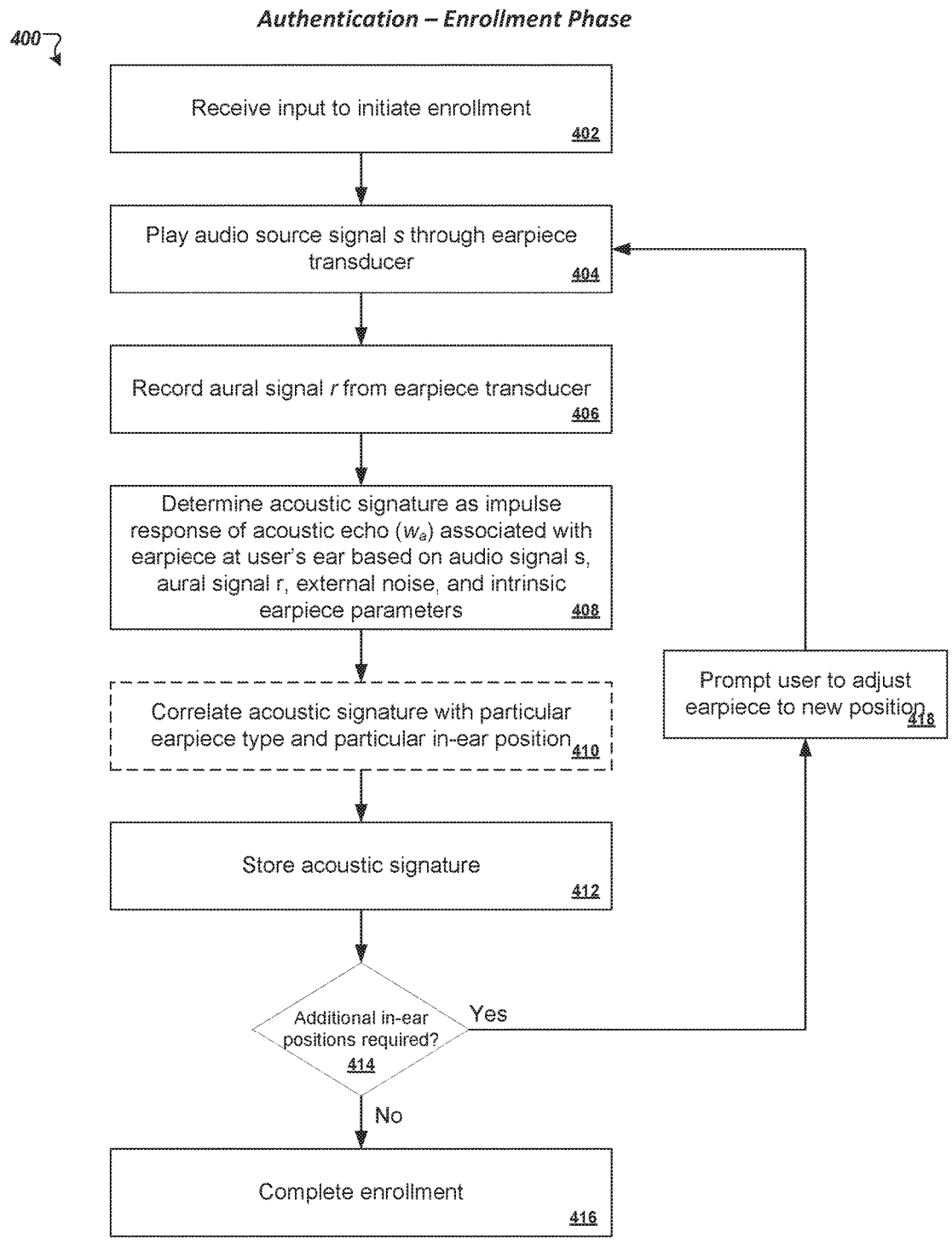
FIG. 4 is a flowchart of an example process for generating an acoustic signature of a user in the enrollment phase of the authentication procedure.

FIG. 4 depicts an example process 400 for enrolling a user on an audio processing device, including generating and registering an acoustic signature for the user.

At stage 402, the audio processing device receives input to initiate enrollment. In some implementations, the device may present a user interface that prompts the user to enroll and provides step-by-step instructions for actions required of the user, such as instructions to insert an earbud into the ear, adjust a position of the earbud, confirm that a sound was heard, etc.

At stage 404, the audio processing device plays a source audio signal s through an earpiece. The audio processing device may, for example, drive a diaphragm of an electroacoustic transducer in the earpiece to cause the earpiece to generate soundwaves for the audio signal s. Various types of audio content may be represented by the source audio signal s. In some implementations, the source audio signal s may be a familiar song, podcast, or other audio track that the user has selected to listen to at a given time. In some implementations, the source audio signal s may be white noise that would be audible to the user if the earpiece were located at the user's ear. In some implementations, the source audio signal s may be outside the normal range of human hearing (e.g., above 20 kiloHertz) such that the audio source signal s cannot be heard by the user, even if the earpiece is located at the user's ear. An inaudible source signal s may be beneficial, for example, to enable performance of the earpiece detection procedure without disturbing the user with unwanted sounds or in other environments where the user may prefer silence or minimal noise. In some implementations, an inaudible source signal s can be added to an audible signal that a user has already selected to play on a device (e.g., music or other audio content) without being detected by a user. In some implementations, the audio processing device may provide a physical or virtual interface (e.g., through a graphical user interface presented on an electronic display of the audio processing device), which allows the user to select the type of audio signal s to play for in-ear detection (e.g., white noise, inaudible, or a pre-recorded audible sound signal). The audio signal may be played for a relatively short span of time, e.g., 0.05-3 seconds, or continuously.

At stage 406, the audio processing device records an aural audio signal r of sound that occurs at the user's ear where the earpiece is located while the audio source signal s is played. In some implementations, aural signal r can be recorded by the audio processing device based on information sensed by the same earpiece transducer that outputs the audio source signal s. The audio processing device may simultaneously play the audio source signal s and record aural audio signal r (e.g., by driving the transducer and calculating a voltage of the transducer at the same moment, or by the playing and recording being performed alternately from each other at high frequency in a time-division duplex scheme so that the user does not perceive that the playing is being interrupted by recording, such as alternating each no longer than each 1 ms, 0.1 ms, or 0.01 ms). In some implementations, the audio source signal s and aural audio signal r may actually be played and recorded concurrently, without alternating between the stages. In some implementations, the earpiece may include a second transducer separate from the first transducer, where the second transducer serves as a dedicated microphone and the first transducer is a dedicated speaker.

At stage 408, the audio processing device determines values for the acoustic echo $w_a$ (e.g., impulse response of acoustic echo of earpiece) associated with the earpiece's current location during a period of time when the device plays the audio source signal s and records the aural signal r. The acoustic echo $w_a$ determined at this stage (408) indicates characteristics of the space in which the earpiece is currently located. An acoustic signature is then generated based on the determined values for the acoustic echo $w_a$. In some implementations, the values of the acoustic echo $w_a$ themselves form the acoustic signature. In some implementations, the values of the acoustic echo may be further processed, filtered, and/or encrypted to generate the acoustic signature for the user.

In some implementations, the audio processing device may generate during the enrollment phase a set of multiple (e.g., 5-10) acoustic signatures for a user. Different attributes may be assigned to different ones of the acoustic signatures that identify respective contexts of the acoustic signatures. For example, the attributes may indicate a particular earpiece type, make, or model for the acoustic signature that corresponds to the earpiece that the user provides during enrollment. The attributes may further indicate an earpiece side (e.g., whether the earpiece is for the user's left or right ear) and a position of the earpiece at the ear. The audio processing device may, for example, prompt the user to rotate an earbud to different positions in the ear so that a collection of possible signatures can be determined and associated with the user, any of which may be valid during the verification phase depending on the position that the user later places the earbud in his or her ear. At stage 412, the acoustic signature is stored in association with an account of the user.

At stage 414, the audio processing device determines whether to prompt the user for signatures at additional in-ear positions. For example, the audio processing device may require a pre-defined number n of acoustic signatures to be generated and registered for a user to complete enrollment, and the process 400 may continue until that number n of valid signatures is reached. If additional acoustic signatures are required, then the process 400 proceeds to stage 418 and the device prompts the user to adjust the earpiece to a new position. The process 400 then repeats from stage 404 to generate an acoustic signature of the user for the changed position of the earpiece. Once a sufficient set of acoustic signatures has been generated, enrollment is completed (stage 416).

Figure 5:
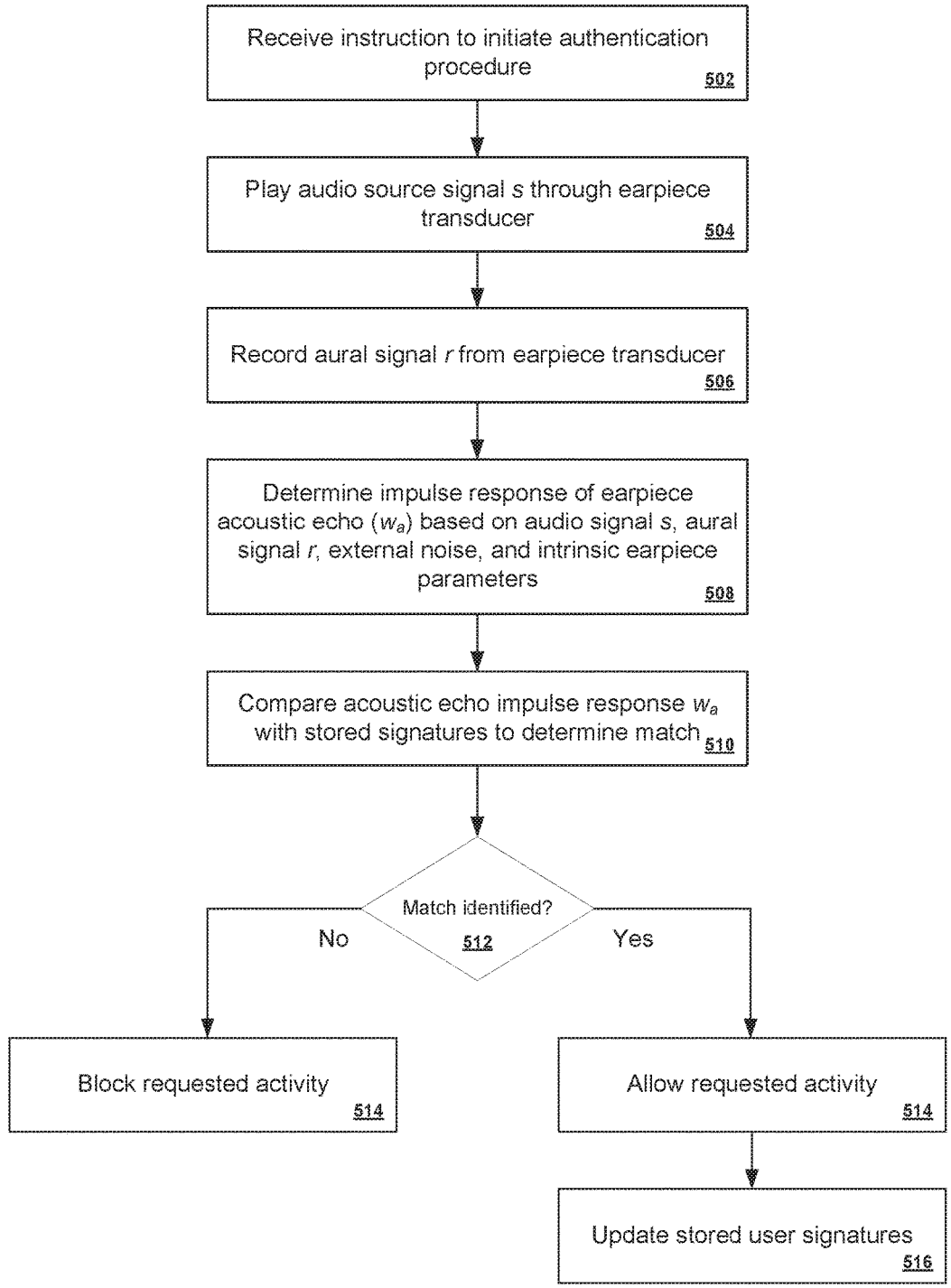
FIG. 5 is a flowchart of an example process for verifying a user's identity in the verification phase of the authentication procedure.

Turning to FIG. 5, a flowchart is shown of an example process 500 for verifying a user's identity (i.e., authenticating a user). The process 500 is generally performed after a user has enrolled and activated aural-based authentication services on a device.

At stage 502, the audio processing device receives instruction to initiate an authentication procedure. The instruction may be in the form of user input to the device, or may be an instruction from an operating system or application on the device, e.g., an application that calls an API associated with an aural-based authentication service.

At stage 504, the audio processing device plays a source audio signal s through an earpiece. The audio processing device may, for example, drive a diaphragm of an electroacoustic transducer in the earpiece to cause the earpiece to generate soundwaves for the audio signal s. Various types of audio content may be represented by the source audio signal s. In some implementations, the source audio signal s may be a familiar song, podcast, or other audio track that the user has selected to listen to at a given time. In some implementations, the source audio signal s may be white noise that would be audible to the user if the earpiece were located at the user's ear. In some implementations, the source audio signal s may be outside the normal range of human hearing (e.g., above 20 kiloHertz) such that the audio source signal s cannot be heard by the user, even if the earpiece is located at the user's ear. An inaudible source signal s may be beneficial, for example, to enable performance of the earpiece detection procedure without disturbing the user with unwanted sounds or in other environments where the user may prefer silence or minimal noise. In some implementations, the audio processing device may provide a physical or virtual interface (e.g., through a graphical user interface presented on an electronic display of the audio processing device), which allows the user to select the type of audio signal s to play for in-ear detection (e.g., white noise, inaudible, or a pre-recorded audible sound signal). The audio signal may be played for a relatively short span of time, e.g., 0.05-3 seconds, or continuously.

At stage 506, the audio processing device records an aural audio signal r that occurs at the user's ear where the earpiece is located while the audio source signal s is played. In some implementations, aural signal r can be recorded by the audio processing device based on information sensed by the same earpiece transducer that outputs the audio source signal s. The audio processing device may simultaneously play the audio source signal s and record aural audio signal r as described above (e.g., with the audio source signal s and aural audio signal r being played and recorded concurrently, without alternating between the stages). In some implementations, the earpiece may include a second transducer separate from the first transducer, where the second transducer serves as a dedicated microphone and the first transducer is a dedicated speaker.

At stage 508, the audio processing device determines values for the acoustic echo $w_a$ (e.g., impulse response of acoustic echo of earpiece) associated with the earpiece's current location during a period of time when the device plays the audio source signal s and records the aural signal r. The acoustic echo $w_a$ determined at this stage (508) indicates characteristics of the space in which the earpiece is currently located.

At stage 510, the audio processing device compares the values determined for the acoustic echo $w_a$ determined at stage 508 with stored acoustic signatures associated with a user. If a match is identified (stage 512), then a specified activity may be permitted to be performed (stage 514), such as logging into a restricted account or unlocking a smartphone. If a match is not identified, then the specified activity may be denied or a different action taken by audio processing device (stage 514).

In some implementations, a device may store acoustic signatures for multiple different people that use the device. The authentication process 500 can then be performed to identify a particular user among the multiple different users who have acoustic signatures registered on the device. For example, a tablet computing device may be shared among different family members in a multi-person family. The device may determine who is interacting with the device based on an aural authentication procedure in which the user places earphones on (e.g., to listen to music, a podcast, a video soundtrack), and the device identifies $w_a$ values for the user and compares the $w_a$ values against acoustic signatures associated with different ones of the family members. The comparison may reveal which of the family members is currently using the device based on, e.g., whose acoustic signature most closely matched the derived $w_a$ values. In some implementations, content may be targeted to a specific user based on the aural identification. For example, a video streaming application may have accounts or profiles associated with multiple people on a device. The video streaming application may use aural-based verification to automatically determine whose account or profile to open. In some implementations, content suggestions or recommendations may be provided to a user based on identification of a given user on a device. For example, the device may maintain records of music or videos played by different users and may correlate the records with respective user accounts or respective acoustic signatures of users. When a person is verified, the device may access the records of media previously played by that person and determine additional content to play or suggest to that person. In some implementations, the verification phase of aural-based on authentication can be performed invisibly to a user. For example, as a user listens to a media file through a headset, the device may continuously or at particular times perform a user verification process to identify the user listening to the media file to collect information about the user's content preferences, to make personalized content selections and recommendations to a user, or to otherwise adapt an experience on the device to the user's personal preferences.

Detection of Earpiece at a User's Ear

In some implementations, an audio processing device may be operable to detect whether an earpiece is located at a user's ear or is located away from the user's ear. For an earbud that is configured to be lodged within an ear, the audio processing device may determine when the earbud has been inserted into the ear of a user or when the earbud is removed from the ear of a user. For an earphone (e.g., from a headphones device), the audio processing device may determine when the earphone has been placed over the ear of a user or has been moved off the ear of the user. As described in the following paragraphs, the detected presence or absence of an earpiece at a user's ear, or the detected change in location of the earpiece relative to the user's ear may trigger specified actions to be performed by the audio processing device or another computing device or system in communication with the audio processing device. For example if, as a user is listening to music or another audio source signal s through his or her audio processing device and the user intentionally removes an earpiece from his or her ear to direct his or her attention to another activity, the audio processing device may detect that the earpiece has been removed from the ear and automatically cause a media player application on the device to pause the music. Later, when the user is ready to begin listening to the music again, the user may simply position the earpiece at the ear to cause the device to automatically resume playback of the music from the same position in the music track where the track had earlier been paused.

Figure 7:
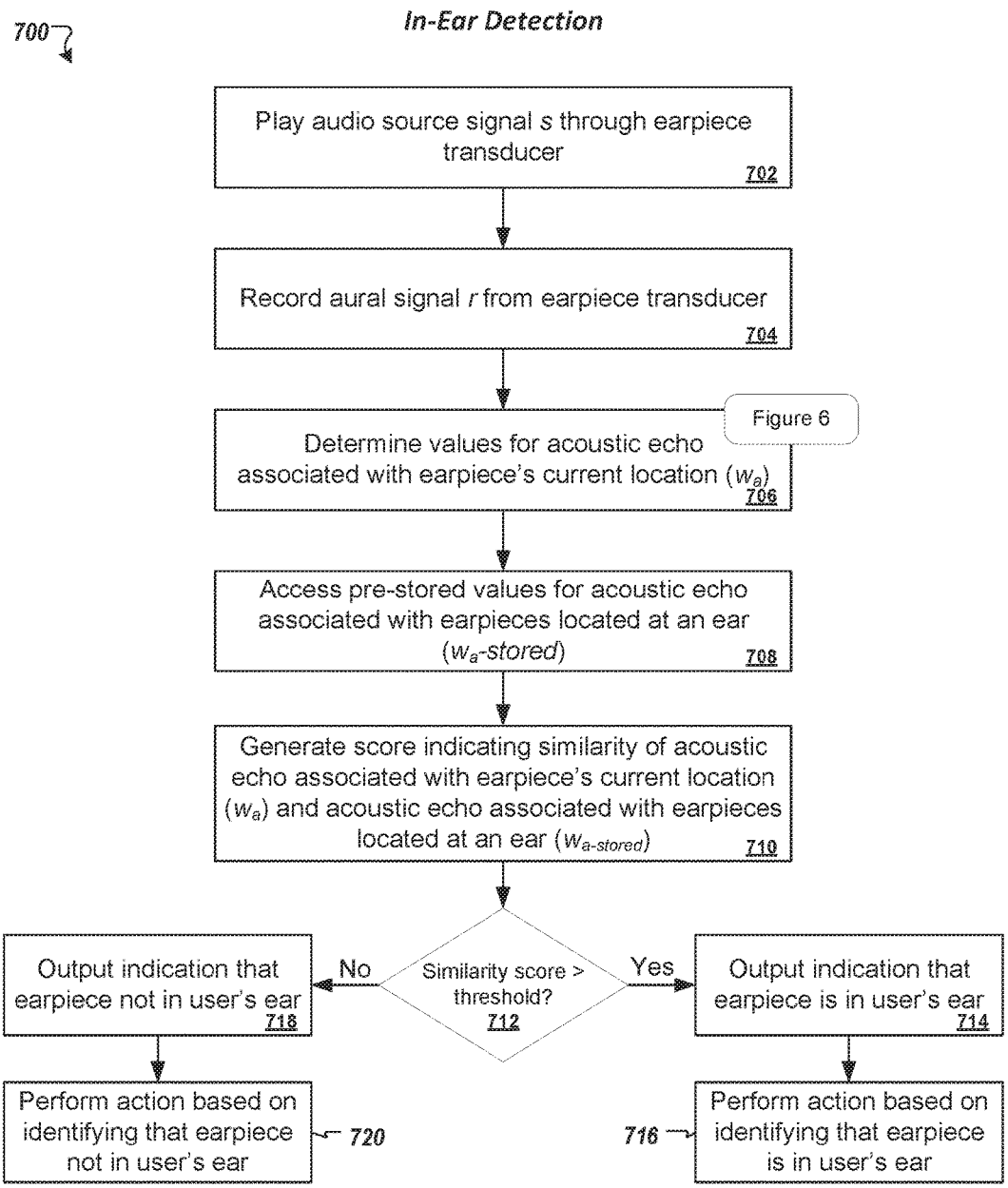
FIG. 7 is a flowchart of an example process for detecting the presence of an earpiece at a user's ear based on features derived from an aural signal recorded during playing of a source audio signal.

Referring to FIG. 7, the depicted flowchart shows an example process 700 for determining the current location of an earpiece vis-à-vis a user's ear, and in particular, whether the earpiece is located at or away from the user's ear. This process may be able to specifically determine whether an earpiece is located in a user's ear, in distinction to merely determining the presence of any object nearby the earpiece. In some implementations, the process 700 may be carried out by the devices and systems described herein, such as audio processing device 202 (FIG. 2A).

At stage 702, the audio processing device plays a source audio signal s through an earpiece. The audio processing device may, for example, drive a diaphragm of an electroacoustic transducer in the earpiece to cause the earpiece to generate soundwaves for the audio signal s. Various types of audio content may be represented by the source audio signal s. In some implementations, the source audio signal s may be a familiar song, podcast, or other audio track that the user has selected to listen to at a given time. In some implementations, the source audio signal s may be white noise that would be audible to the user if the earpiece were located at the user's ear. In some implementations, the source audio signal s may be outside the normal range of human hearing (e.g., above 20 kiloHertz) such that the audio source signal s cannot be heard by the user, even if the earpiece is located at the user's ear. An inaudible source signal s may be beneficial, for example, to enable performance of the earpiece detection procedure without disturbing the user with unwanted sounds or in other environments where the user may prefer silence or minimal noise. In some implementations, the audio processing device may provide a physical or virtual interface (e.g., through a graphical user interface presented on an electronic display of the audio processing device), which allows the user to select the type of audio signal s to play for in-ear detection (e.g., white noise, inaudible, or a pre-recorded audible sound signal). The audio signal may be played for a relatively short span of time, e.g., 0.05-3 seconds, or continuously.

At stage 704, the audio processing device records an aural audio signal r of sound that results in a space where the earpiece is located while the audio source signal s is played. In some implementations, aural signal r can be recorded by the audio processing device based on information sensed by the same earpiece transducer that outputs the audio source signal s. The audio processing device may simultaneously play the audio source signal s and record aural audio signal r, or the playing and recording may be performed alternately from each other, e.g., in a time-division duplex scheme. In some implementations, the earpiece may include a second transducer separate from the first transducer, where the second transducer serves as a dedicated microphone and the first transducer is a dedicated speaker.

At stage 706, the audio processing device determines values for the acoustic echo $w_a$ associated with earpiece's current location during a period of time when the device plays the audio source signal s and records the aural signal r. The acoustic echo $w_a$ determined at this stage (706) indicates characteristics of the space in which the earpiece is currently located. Depending on whether the earpiece is currently located at or away from the user's ear, the values of $w_a$ may vary significantly, thereby allowing determination of the location of the earpiece from the $w_a$ values. In some implementations, the audio processing device determines the values of $w_a$ according to the process 600 set forth in FIG. 6, as described previously.

At stage 708, the audio processing device accesses pre-stored values for the acoustic echo $w_{a\text{-}stored}$ associated with earpieces that were previously determined to be located at an ear of a user. The values of $w_{a\text{-}stored}$ are thus representative of values that would be expected if an earpiece is located at the ear of the user. The values of $w_{a\text{-}stored}$ may be determined based on analysis of the acoustic echo from previous instances in which the earpiece was determined to be located at (i) the ear of the same user for which the device determined $w_a$ at stage 706, (ii) the ears of other users (e.g., users or testers associated with a provider of the in-ear detection service), or (iii) the ears of both the same user from stage 706 and other users. In some implementations, the values of $w_{a\text{-}stored}$ may be automatically updated based on updated values pushed to the audio processing device from a server system or based on feedback from the user of the audio processing device indicating whether previous determinations of the location of an earpiece were accurate.

In some implementations, the audio processing device may access different values for $w_{a\text{-}stored}$ based on the particular earpiece worn by the user or based on a predicted position of the earpiece. Since the values of the acoustic echo parameter $w_a$ may be sensitive to differences among earpiece design and differences in position of the earpiece at the user's ear that impact the acoustic properties of the space in which the earpiece is located, the audio processing device may identify the pre-stored values for $w_{a\text{-}stored}$ that most closely match the conditions of the user's earpiece during the course of process 700. For example, the device may recognize that the earset connected to the device are IPHONE earbuds, and may select values for $w_{a\text{-}stored}$ that are appropriately correlated with these types of earbuds. In some implementations, the device may store information about the frequencies at which a user has historically positioned an earpiece at his or her ear, and may first access pre-$_{stored}$ values for $w_{a\text{-}stored}$ that correspond to one or more positions that the user most frequently places the earpiece at his or her ear. The values of $w_{a\text{-}stored}$ may differ from acoustic echoes that were determined from earpieces that were merely placed near non-ear objects or inside of non-ear objects. In other words, the values of $w_{a\text{-}stored}$ may be specific to one or more user ears. In some implementations the values of $w_{a\text{-}stored}$ may reflect acoustic echoes that were determined from earpieces that were placed near any objects (whether or not ear objects), such that the audio processing device is able to determine whether the earpiece is near any object.

At stage 710, the audio processing device compares the values of $w_a$ (derived at stage 706) with the values of $w_{a\text{-}stored}$ (derived at stage 708). In some implementations, the device determines a similarity score that indicates how closely the values of $w_a$ match the values of $w_{a\text{-}stored}$. Generally, a closer match between the values indicates a greater likelihood that the current location of the earpiece is at the user's ear. At stage 712, the audio processing device may evaluate the similarity score with respect to a threshold score. If the similarity score satisfies the threshold (e.g., is greater than or equal to the threshold score), then the process 700 proceeds to stage 714 and the device outputs an indication that the earpiece is in the user's ear. If the similarity score does not satisfy the threshold, the process 700 proceeds to stage 718 and the device outputs an indication that the earpiece is not located in the user's ear. In some implementations, the audio processing device compares one or more values for $w_a$ to stored values of $w_{a\text{-}stored}$ or predetermined functions, thresholds, parameters, or tolerances, to determine whether the earpiece is near any object (not necessarily an ear). In response to determining that the earpiece is near an object or not near an object, the audio processing device may output an indication to that the earpiece is near an object or not near an object, to trigger a corresponding action.

In some implementations, different actions may be performed on the audio processing device or on another device based on whether the earpiece is determined to be located in the user's ear. For example, a first action may be performed based on identifying that the earpiece is located at the user's ear (stage 716); alternatively, a second action may be performed based on identifying that the earpiece is located away from the user's ear (stage 720). In some implementations, the audio processing device may continuously monitor the location of an earpiece, and an action may be triggered based on identifying that the earpiece has been moved to a user's ear or identifying that the earpiece has been moved away from the user's ear.

Different types of actions that may be performed on the audio processing device or another computing device responsive to determining a location of an earpiece with respect to a user's ear include playing a media file, pausing the media file, stopping the media file, resuming play of a paused media file, activating an electronic display, adjusting a brightness setting of a backlight of the electronic display, transitioning a device into a locked mode, transitioning a device out of a locked mode, initiating a telephone call, ending a telephone call, launching an application, or closing an application. For example, a media player may pause a song if a user's earpiece falls out of the user's ear; a telephone application may end a call, switch to speakerphone or other internal speaker of the device, or generate an alert to parties on a call if the user's earpiece is no longer detected at the user's ear; or a media application may begin playing a song or other media file in response to determining that an earpiece has been moved to a location at the user's ear. In some implementations, for example, when the device detects that the user has inserted the earpiece back into his or her ears, the device may revert to a mode that existed before the earpiece was removed, such as switching back from speakerphone to earpiece use during a telephone call.

Active Noise Control Using Pre-Recorded Sounds

In some implementations, an audio processing device may perform active noise cancellation using pre-recorded sounds. Generally, these techniques allow a device to access a stored instance of a pre-recorded audio signal and use the stored instance of the pre-recorded audio signal to cancel interference or noise caused by the playing of another instance of that same pre-recorded audio signal in an environment of a user. For example, a user may wear earphones during a workout at a gym to listen to songs on his or her personal playlist. The gym, however, may play (or even blast) music through a loudspeaker, and the presence of the gym's loudspeaker music may make it difficult for the user to hear his or her preferred audio content. Accordingly, a microphone associated with the user's audio device (e.g., a microphone that is the same electroacoustic transducer as the transducer that outputs a played audio signal, a separate microphone on the user's headset, a microphone that is external to the audio device and separate from the user's headset, a microphone that is built into the user's headset, or two or more of these microphones) may record an audio signal that identifies environmental noise around the user, which includes the music playing through the gym's loudspeaker. The device may process that recorded audio signal to identify the particular music playing through the gym's loudspeaker (e.g., a Lady Gaga song, a Rolling Stones song, or a Prince song), and then may access a copy of the same music and use that copy to predict in real-time how to cancel noise resulting from the song being played through the loudspeaker in the user's environment.

One notable benefit of using pre-recorded sounds for active noise cancellation is that the latency in generating a modified, noise-cancelled audio signal can be substantially reduced as compared to other active-noise cancellation approaches. This is because the stored instance of a pre-recorded audio signal can effectively serve as a map that the audio processing device can use to predict environmental sound before it even occurs.

Figure 8:
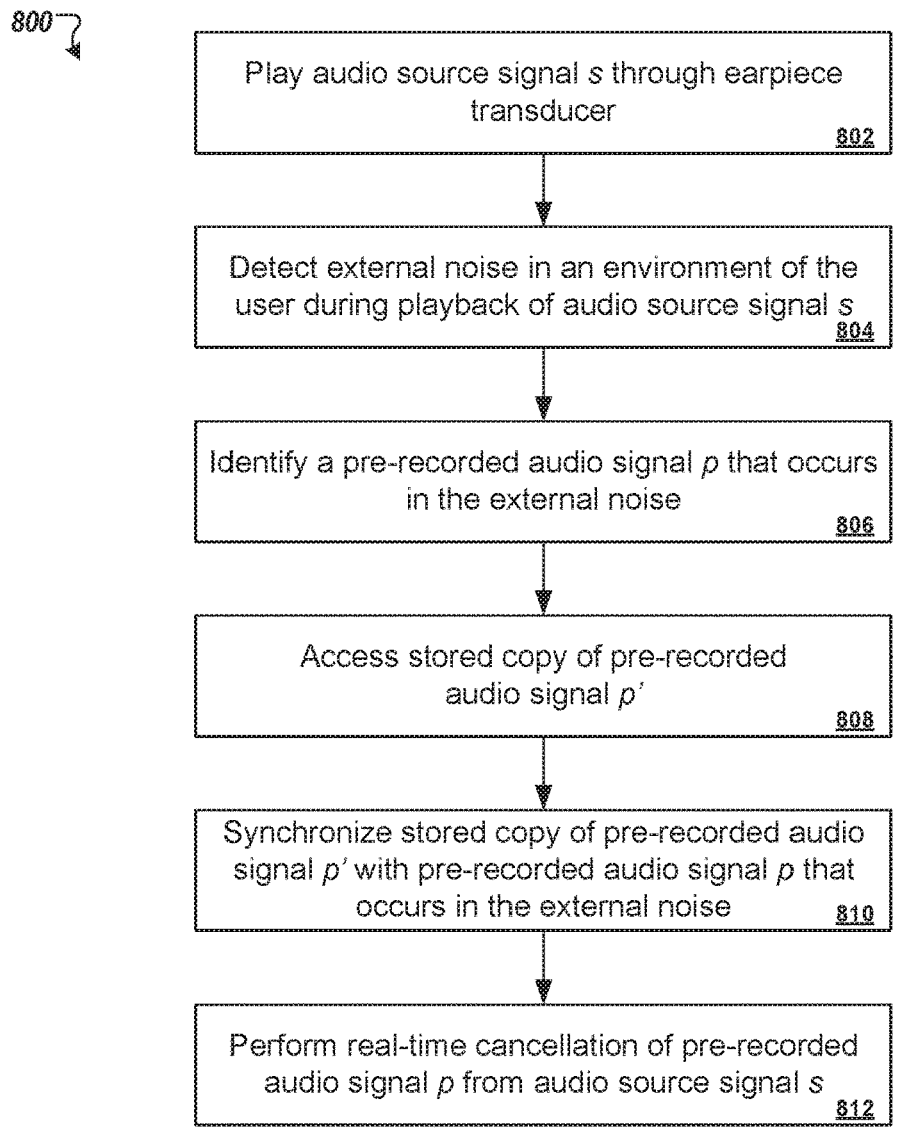
FIG. 8 is a process for using a stored instance of a pre-recorded audio signal to cancel interference resulting from the pre-recorded audio signal playing in an environment of a user as the user listens to a source audio signal through a headset.
Figure 9B:
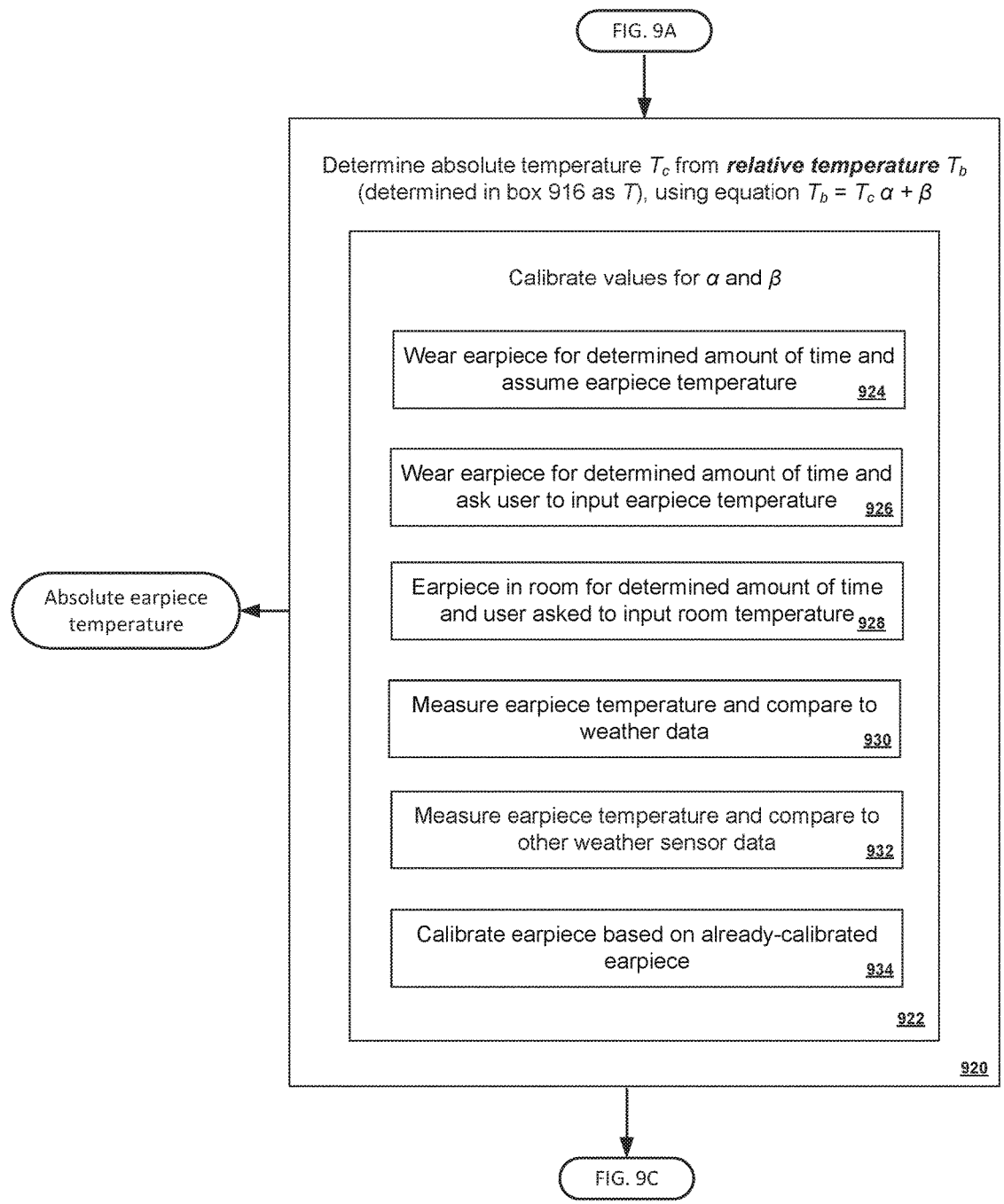
Figure 9C:
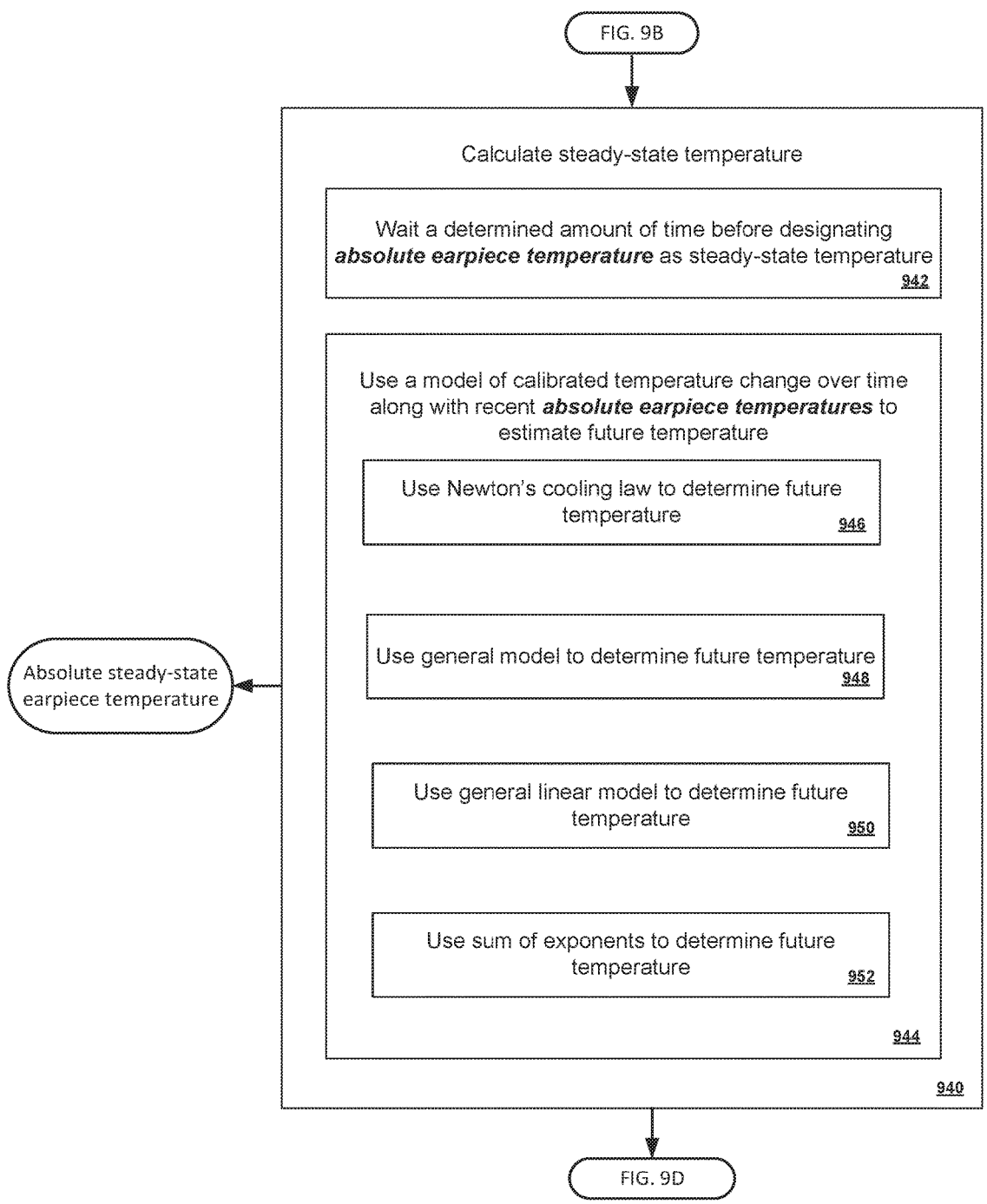
Figure 9D:
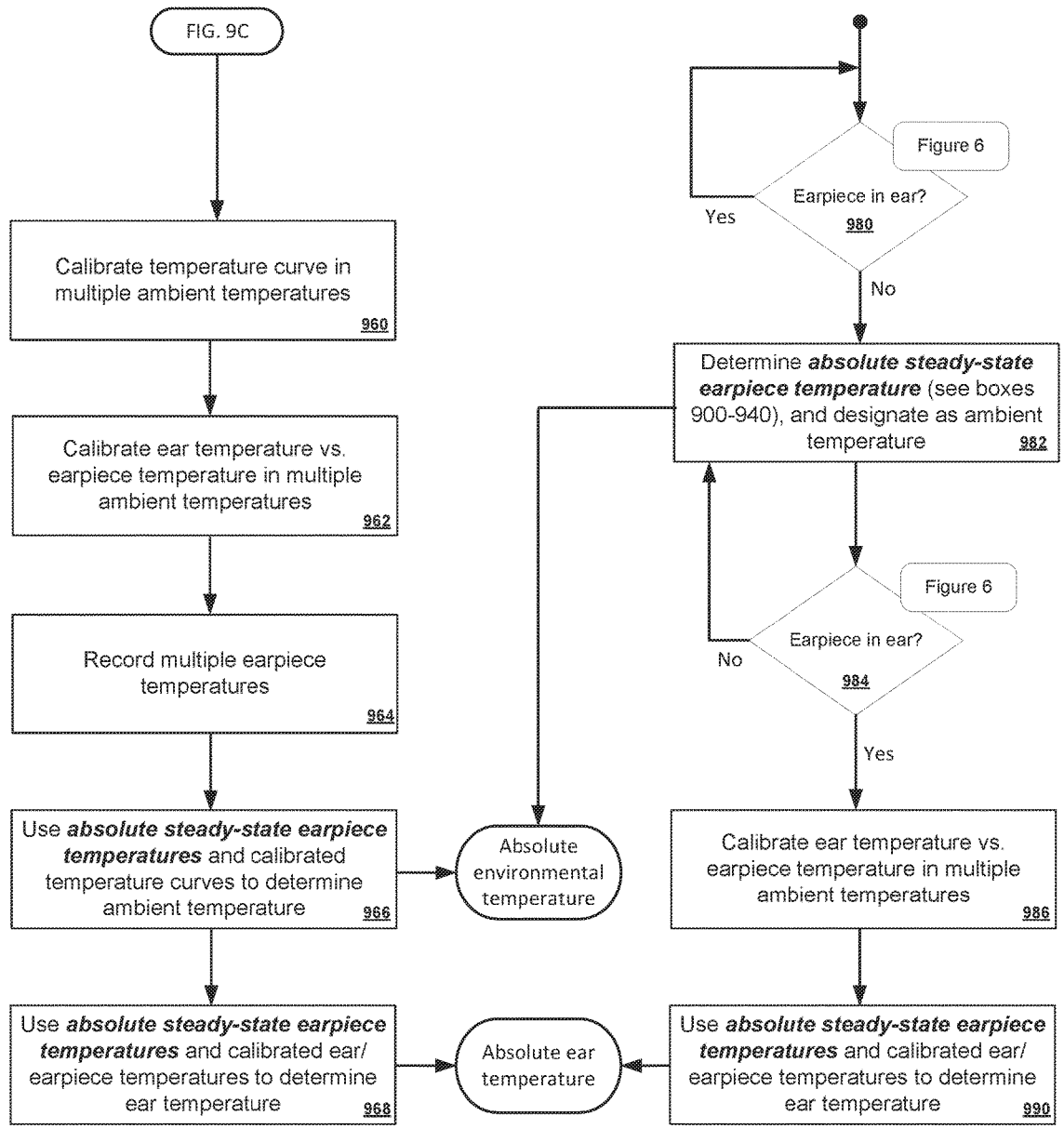

An example process 800 for example noise cancellation with pre-recorded sounds is represented in the flowchart of FIG. 8. At stage 802, the audio processing device plays a source audio signal s through an earpiece transducer located at a user's ear. For example, the user may be listening to a podcast, but he or she may be located in a noisy environment such as a restaurant, coffee shop, or public transit. At stage 804, the device captures an audio signal sensed by a microphone connected to the device (e.g., where the microphone could be the same transducer through which the source audio signal s was played). The recorded audio signal contains environmental noise (i.e., external or ambient noise around a user). At stage 806, the device identifies a pre-recorded audio signal p that occurs in the captured environmental noise. By way of example, the pre-recorded audio signal may be a particular song played on the radio as background noise in a shop or restaurant. The device may identify the particular song by accessing a database of pre-recorded audio signals and comparing a sample of the audio signal p that was recorded from the microphone with portions of the audio signals stored in the database. At stage 808, the device accesses a stored instance of the pre-recorded audio signal p'. The device then synchronizes the stored instance of the pre-recorded audio signal p' with the audio signal p that occurs in the external noise, which can occur in real-time as the song continues to play in the background. At stage 512, the device cancels the pre-recorded audio signal p from the audio source signal s using the pre-recorded audio signal p'. For example, the pre-recorded audio signal p' (or a processed signal derived from the pre-recorded audio signal p') may be subtracted in a manner that is synchronized with the background audio signal p, so that the pre-recorded audio signal p' cancels the distortion imparted on audio signal s by background audio signal p. Additional techniques for performing active noise cancellation are discussed in WIPO Publication WO2014/178054, which is hereby incorporated by reference in its entirety.

In some implementations, active-noise cancellation with a pre-recorded audio signal can be performed as follows, using a common transducer in an earpiece to play and capture noise. The pre-recorded audio signal is represented as p. The signal recorded from the microphone (e.g., the common transducer in the earpiece) is represented as a. Another parameter used in this scenario is $w_{room}$, i.e., the room impulse response, which describes the relationship between p and a. In particular, a is the convolution of $w_{room}$ and p. Note, this example refers to a "room" and a "room impulse response" to refer to the environment of a user, which is often an at least partially closed environment in which a loudspeaker outputs audio content.

The values of the $w_{room}$ parameter may vary as the user moves around the room and can vary depending on characteristics of the room itself in which the user is located. Generally, $w_{room}$ is sensitive to the configuration of a given room where the user is located, the user's position in the room, the loudspeaker's position in the room, and the relative locations of the user (i.e. of the user's microphone) and the loudspeaker. If the location of the user and conditions in the room do not change, the values of $w_{room}$ may remain generally static, but if, on the other hand, the location of the user or other conditions of the room do change, the values of $w_{room}$ may vary accordingly. Generally, for very small intervals of time (e.g., 0.01 seconds, 0.1 seconds), $w_{room}$ will not change significantly from one interval to the next. If the audio processing device has As the user listens to a source audio signal s, and as one or more microphones (e.g., the electroacoustic transducer of the earpiece lodged in the user's ear) sense audio signal a, the user's audio processing device may continuously and repeatedly re-calibrate $w_{room}$. Once the device determines $w_{room}$, and the device has identified the pre-recorded audio signal p from the environmental noise, the device can predict a as the convolution of p and w_room for a next time interval (e.g., 0.1 seconds, while $w_{room}$ remains relatively constant from the preceding time interval). In some implementations, the audio processing device may re-calculate $w_{room}$ and predict intervals for noise cancellation at even higher frequencies for less latency, e.g., every 0.1-3 milliseconds. Once the device determines a, the device can perform algorithms to "inverse" the signal, such as finding a signal s that when played from the headphones outputs—a, to cancel the background noise.

Temperature Measurement

Using the techniques described in this document, a device may measure temperature using a transducer, for example, one that is located in an earpiece to play audio. The measured temperature may be that of the earpiece, but using various mechanisms described herein, the temperature of a user's ear or of an environment in which the earpiece is located may be inferred. There are various benefits to performing temperature measurement using an earpiece rather than a dedicated thermometer. A main benefit is that earpieces already on the market may be converted into temperature-sensing devices, without any modification of the earpieces being required in some implementations. As such, phones and other devices to which earpieces may be connected can be programmed to sense the temperature of a user or environment without adding a dedicated temperature sensor. Moreover, the techniques described herein are valuable because, even if one designed an earpiece or mobile device to include a temperature-specific sensor (e.g., a thermistor), the heat generated by the user, phone, or earpiece may affect the temperature of that temperature-specific sensor.

Enabling a mobile device to measure temperature with an earpiece serves many beneficial uses. For example, health applications such as fitness trackers may regularly record a user's temperature and plot it over time. As such, a user or computing system can compare recent user temperatures to historical user temperatures to determine whether the user may be falling ill or whether the user's physiology may be changing, and may notify the user of such changes. Statistics may be recorded, for example, to better estimate calories burned by athletes, to alert athletes of possible hyperthermia during a workout, and to estimate days of female ovulation. Such mechanisms may also track environmental temperature as a function of athletic performance (e.g., by charting running times vs. outdoor temperature).

At least two example mechanisms can measure temperatures using a transducer. A first example mechanism is to estimate the temperature of the earphone (e.g., the transducer coil) itself, based on the effect that earphone temperature has on the electrical properties of the earphone. This mechanism uses Equation 1 that is described previously in this document to determine T at various points in time. Such a mechanism may work for most or all earphones, so long as the system has calibration information for that type of earphone. Still, it may take a while for the earphone to heat or cool to the temperature of its environment, so the mechanisms described herein can analyze the earphone's change in temperature to estimate the future earphone temperature. The future earphone temperature can be compared to calibration data to infer the current environmental and/or user temperature. A second example mechanism is to analyze the recorded sound to determine properties of the air in a user's ear canal. Because properties of the air such as temperature can affect the playing of sound through that air, the temperature may be deduced by analyzing the recorded sound. This disclosure will next describe each of these temperature-determination mechanism.

First Mechanism: Measure Earpiece Temperature

In the first mechanism, as previously described, the system measures temperature by simultaneously playing and recording audio (audible or inaudible) and detecting changes in the earphone's electrical properties due to temperature changes of the earphone (e.g., its coil). This situation is similar to that of an electrical circuit that contains a resistor whose resistance is temperature-correlated, and where one part of the circuit is connected to a fixed output voltage (e.g., a sound card output), and another part of the circuit is connected to a voltage meter (e.g., a sound card input). With this configuration, one is able to determine the current impulse response of the circuit. The current impulse response can be compared to previously-stored, temperature-dependent impulse responses to determine the current temperature of the resistor. This process is described in detail with respect to certain portions of the process illustrated with respect to process 900 (see FIGS. 9A-D).

At box 902, the computing system determines T by recording a number of audio samples rand determining how temperature affected r given the played audio samples s and known transformation characteristics of the earpiece, such as $w_0$ and $w_\Delta$, that affect the played audio signal. Doing so involves use of Equation 1.

At box 904, the operations of box 902 can be performed by using at least a portion of process 600 (see FIG. 6). In particular, the computing system can perform steps 602-624 of process 600 to determine T.

At box 906, the computing system performs a variation of process 600, by solving for T, but adding a high-frequency noise to the output audio signal s. Adding this high-frequency signal to s may be helpful because s may not otherwise include audio at certain times, and because temperature measurement may be more effective with high-frequency signals. Modifying s in this manner can involve performing the process 600 with some variations thereto, which are described below with respect to boxes 908-914.

At box 908, the computing system may set $s=s_0+s_{highfreqs}$. An example high frequency signal may be a 20,000 Hz sine wave.

At box 910, the computing system may perform the operation of box 610, by calculating $r_{diff}=r-s*w_0$, but with the s value that has been modified to include a high-frequency value, as described above.

At box 912, the computing system may perform the operations of box 612, by calculating $r_\Delta=s_{highfreqs}*w_\Delta$. In this example, the operation substitutes $s_{highfreqs}$ instead of s, because $s_{highfreqs}$ may be suitable for calculating temperature (although $s=s_0+s_{highfreqs}$ may be used for other calculations, such as determinations of $w_a$). $s_{highfreqs}$ may not be audible, and thus may not significantly affect $w_a$, but still in some examples, $s_{highfreqs}$ is not added to s for determinations of $w_a$.

At box 914, the computing system may perform the operations of box 614 by determining the temperature T that minimizes the difference between $r_{diff}$ and the convolution of T and $r_\Delta$ (i.e., $T=\text{argmin}_T(r_{diff}-T*r\Delta)$). The values of $r_{diff}$ and $r_\Delta$, however, may have been influenced by the addition of $s_{highfreqs}$.

At box 916, the computing system may combine multiple values for T over a determined time period. For example, the system may concatenate temperature measurements determined over a time period that is 0.03, 0.05, 0.1, 0.2, or 0.5 seconds long. Example types of combination include averaging and linear regression.

At box 920, the computing system determines the absolute temperature using the proportional temperature T that was determined at box 916. This determination may be performed because the value T may not provide an absolute temperature, but may simply be a voltage value that changes based on temperature, and that can be converted to an absolute temperature (e.g., centigrade) by providing an offset and scaling constant. Since there are multiple temperature described values here, the absolute temperature identified at box 916 will be denoted $T_c$, and the relative temperature will be denoted as $T_b$. Combining these values into an equation with β to identify an offset and α to represent scaling provides $T_b=T_c\alpha+\beta$.

At box 922, the computing system (or another system) calibrates the values for α and β. This calibration may be performed ahead of time (e.g., before any temperature measurements are taken). For example, the calibration may be performed when a user initially uses a particular earpiece, or can be performed by the manufacturer of the earpiece or by another third-party organization. In these later examples, the calibration values may be shipped with a mobile device or with headphones, or may be accessible through an internet database. There are at last six mechanisms to determine these calibration values, described below with respect to boxes 924-934.

At box 924, in a first mechanism, a user wears the earpiece for a determined amount of time (e.g., 5 or 10 minutes), and the earpiece temperature after that period of time is assumed to be a typical user body temperature. For example, the earpiece temperature may be assumed or estimated to be a mean body temperature of a human (e.g., 36.7 degrees). There may be no measurement of user temperature. Rather, there may be just an assumption that the earpiece is the average human temperature. In some examples, the temperature is estimated to be a typical temperature of an earpiece when placed in an ear of a user with a mean body temperature in a room of a mean room temperature.

At box 926, in a second mechanism, the user wears the earpiece for the determined period of time, and the system asks the user to input temperature $T_c$, which may be the user's temperature or the mean temperature of the earpiece and the ambient temperature.

At box 928, in a third mechanism, the earpiece is placed in a room and, after a determined amount of time, the user is asked to input the temperature of the room.

At box 930, in a fourth mechanism, the temperature of the earpiece is measured multiple times at different times of a day and/or on different days. The mean or median temperature measurement in such an example may designated as $T_b$ while the mean or median temperature at locations of the mobile device and earpiece at such times according to weather history data may be designated as $T_c$.

At box 932, in a fifth mechanism, the earpiece may be placed in a room or other environment, and the system may be connected to an external sensor that determines the absolute temperature $T_c$ of the environment in which the earpiece is place, while the earpiece is used to measure its relative temperature $T_b$.

At box 934, in a sixth mechanism, a second earpiece may be calibrated based on an already-calibrated first earpiece.

First, a first earpiece may be calibrated using any of the above-described mechanisms. Second, the system may then set $w_A = w_A$ (alpha) (e.g., by multiplying $w_A$ by a coefficient and setting it as the new $w_A$). Third, some feature of $w_A$ may be computed and denoted as C (e.g., 2 norm, $C = \|w_A\|$ or some weighting on the frequency response of $w_A$, or some fraction between the response of the earphone in two frequencies). Fourth, a user may connect a second earpiece to a device and the device may compute the same feature of $w_A$ and denote that feature as D. Fifth, the device may calculate the $w_A$ of the second earpiece given C, D, and the $w_A$ of the first earpiece using the following formula: $w_{A\text{-}second\_earpiece} = C/D \; w_{A\text{-}first\_earpiece}$. A similar mechanism using $w_0$ instead of $w_A$ also applies.

Faster Prediction of Temperature

Sometimes, an earpiece's heat transfer coefficient is small, which means that the earpiece coil and membrane sometimes take a while to reach the temperature of its environment. As an example, in some earpieces, the time constant is around 100 seconds, which means that if the earphone is taken out of a pocket at 30 degrees centigrade and is placed in a 15 degree environment, it could take more than five minutes for the earphone to achieve 15 degrees, plus or minus 0.5 degrees.

At box 940, the computing system identifies the steady-state temperature of the earpiece. This is the temperature that the earpiece may level out at after being in an environment for a certain amount of time. In other words, the earpiece may have the same temperature as its environment at steady state.

At box 942, the computing system may wait a determined amount of time (e.g., 5 minutes in the above example) before designating the temperature of the earpiece as the steady-state earpiece temperature. Essentially, the computing system may wait for the earpiece temperature to heat up or cool down before designating the measured temperature as the steady-state temperature. In some examples, this determination of the amount of time involves the computing system determining when the temperature has stopped changing or that the rate of change in temperature has fallen below a determined threshold.

At box 944, the computing system may use a model of calibrated temperature change over time for the earpiece—along with recent changes in earpiece temperature—to estimate the temperature of the earpiece in the future (e.g., at steady state), even though the earpiece temperature may still be changing and has yet to reach steady state. Using this model may enable estimating the earpiece steady state more quickly than waiting minutes for the earpiece to heat up or cool down. Four such models are described below, with reference to boxes 946 through 952. Because the earpiece may be have a complex body with a coil, plastic, a membrane, and potentially other features, Newton's law of cooling may provide a poor estimation of the earphones temperature in some scenarios, because Newton's law of cooling may best apply to simple materials, such as resistance temperature detectors.

At box 946, as a first example, Newton's law of cooling may be used to determine the future temperature of the transducer, for example, in scenarios in which Newton's law of cooling would provide an adequate estimation of the earphone's temperature.

$$T(t) = T_{env} + (T(t_0) - T_{env})e^{-r(t-t_0)}$$

In this equation, e is the temperature at time t, r is the heat transfer coefficient that depends on the type of earpiece, and $T_{env}$ is the temperature of the environment. With the goal of reading temperature samples to estimate $T_{env}$, a system can predict the temperature when r is uncalibrated using the following four steps: (1) Use $T_1, T_2, \ldots T_n$ at times $t_1, t_2, \ldots t_n$ as inputs; (2) Use the approximation $$T'_{(t)} = \frac{T_i - T_{i-1}}{t_i - t_{i-1}}; \tag{3}$$

Use the equation $T'^{(t)} = -r(T_{env} - T(t))$ to solve the ML $a, b = \mathrm{argmin}_{a,b} \Sigma_i \, (T'_i - (a + bT_i))^2$; and (4) set $r = b$, $$T_{env} = -\frac{a}{b}.$$

If r is calibrated, the following two steps may be performed: (1) Use $T_1, T_2, \ldots T_n$ at times $t_1, t_2, \ldots t_n$ as inputs; and (2) Solve the MLSQ of the following:

$$T_{env} = \mathrm{argmin}_{T_{env}} \sum_i (T_i - (T_{env} + (T(t_0) - T_{env})e^{-r(t_i - t_0)}))^2$$

This second set of operations may be more quick to perform than the first set of operations because r has already been calibrated. Thus, once r has been calibrated, the system may perform the second set of operations without recalibrating r.

At box 948, as a second example, a General Model may be used to determine the temperature at a time in the future. There exists decreasing functions $F_+$, $F_- \to 0$, such that, ($F_+$, $F_- \to 0$)

if $T(t_0) < T_{env}$: $T(t+t_0) = T_{env} - F_+^{-1}(t + F_+(F(t_0) - T_{env}))$ if $T(t_0) > T_{env}$: $T(t+t_0) = T_{env} + F_-^{-1}(t + F_-(F_+(t_0) - T_{env}))$ The functions $F_+$, $F_-$ depend on the earphone's model and material. These equations may be solved using a linear least squares algorithm.

At box 950, as a third example, a General Linear Model may be used to predict the temperature at a time in the future, using a function F:

$$T(t) = F(T_{env} - T(t))$$

With this in mind, temperature prediction may be performed using an input of temperature measurements $T_1, T_2, \ldots T_n$ at times $t_1, t_2, \ldots t_n$ and a calibrated e. The system can then solve the following optimization problem using enumeration, binary search, or some other method:

$$T_{env} = \mathrm{argmin}_{T_{env}}(T'_i - T(t))^2$$

At box 952, as a fourth example, a Sum of Exponents modeling may be used to predict the temperature at a time in the future:

$$T(t) = T_{env} + \mathrm{sum}_{i=1 \ldots k}[a_i e^{-r_i(t-t_0)}]$$

In this example, the constants $a_i$ and $r_i$ are coefficients that depend on the earphone's model. This equation may be solved using a linear least squares algorithm.

In some implementations, although the example shown in the figures present calculation of the steady-state temperature after the computing system has converted the relative temperature to an absolute temperature, the system may calculate the steady-state temperature before the temperature is converted from a relative-temperature to an absolute temperature. The conversion may then occur after the calculation of the steady-state temperature.

Body Temperature Measurement (First Approach)

Once the system has measured the temperature of the earpiece (e.g., either by waiting a determined amount of time (see box 942), or using the above-described temperature models to calculate future earpiece temperature (see box 944)), a user ear/body temperature, such as their tympanic temperature may be determined. The earpiece coil may be spaced apart from the user's tympanic membrane, and therefore may have a temperature that is based on a combination of the user's ear temperature and the environmental temperature.

This disclosure describes mechanisms to determine user temperature and even environmental temperature when the temperature of an earpiece is known. In fact, although the following description is explained with reference to a transducer that is used as both a speaker and a microphone, the process would also apply to body and environment temperature determinations that use other types of temperature-sensing devices, such as dedicated microphones, thermometers, resistance temperature detectors, and thermistors. This is because the below discussion explains how to determine a user or environmental temperature sometimes using just the temperature-sensing device (which just happens to be a transducer in this example).

More specifically, and as just mentioned, the temperature of the earpiece (or another temperature-sensing device) depends on the ambient temperature and the temperature of the user's body, such as the ear canal temperature. As such, determination of the body temperature may sometimes involve obtaining multiple temperature measurements over time. Still, the temperature curve that can be constructed from the multiple temperature measurements may be unique for a given ambient/environmental temperature. Accordingly, using the shape of the temperature curve, the system may be able to determine the temperature of the user and the ambient temperature. This process includes four basic steps, which are discussed in turn.

At box 960, the computing system can calibrate the behavior of the temperature curve in multiple ambient temperatures.

At box 962, the computing system can calibrate the ear temperature versus the earpiece temperature in many different ambient temperatures. For example, the system may store, for each of multiple earpiece temperatures, multiple ambient temperatures and the user temperatures that correspond to that specific set of earpiece and ambient temperatures. In other words, the system may store many sets of three temperature, or otherwise use such information to interpolate intermediate values using predictive formulas.

Both these calibrating steps may be performed ahead of time, for example, before any real-time temperature measurement is taken. Indeed, the calibration may occur at a factory and be pre-installed with the earpiece or mobile device, or may be accessible through an internet database.

At box 964, the computing system may record multiple earpiece temperature measurements.

At box 966, the computing system can use the multiple earpiece temperature measurements and the calibration information identified at box 960 to determine the ambient temperature.

At box 968, the computing system can use one or more of the multiple earpiece temperature measurements and the calibration information identified with respect to box 962 to determine the user temperature. For example, the system may identify the user temperature that matches the determined earpiece temperature and the determined ambient temperature.

There are at least two models that can be used to calculate the ambient and user temperatures given a series of temperature measurements and calibrated values.

The first such model is a general model. There exist decreasing functions $F_+$, $F_-$, $G_+$, $G_+ > 0$, such that ($F_+$, $F_-$, $G_-$, $G_+ \to 0$) if $T(t_0) < \alpha T_{ear} + (1-\alpha) T_{amb}$ The functions F+, F− depend on various characteristics, such as the earpiece model, material, and design.

$$T(t+t_0) = \alpha T_{ear}(1-\alpha)T_{amb} - F_+(t+F_+^{-1}(F_+(t_0)-T_{ear})) - G_+(t+G_+^{-1}(G_+(t_0)-T_{amb}))$$

if $T(t_0) < \alpha T_{ear} + (1-\alpha)T_{amb}$, $T(t+t_0) < \alpha T_{ear}(1-\alpha)T_{amb} + F_-(t+F_-^{-1}(F_-(t_0)-T_{ear})) + G_-(t+G_-^{-1}(G_-(t_0)-T_{amp}))$ To solve for the general model, the system can first calibrate for F and G for various values of ambient temperature and a. Then, a system may deduce $T_{amb}$ and $T_{ear}$ using MLSQ.

The second such model is Newton's model.

$$T(t) = P[T_{amb}, T_{ear}] + (T(t_0) - T_{env}) e^{-R[T_{amb}](t-t_0)}$$

Sometimes, $P[T_{amb}, T_{ear}] = \alpha T_{amb} + (1-\alpha) T_{ear}$, and then
$T(t) = \alpha T_{amb} + (1-\alpha) T_{ear} + (T(t_0) - T_{env}) e^{-R[T_{amb}](t-t_0)}$ In this example, $P(T_{amb}, T_{ear})$ is the final temperature of the earpiece when the ambient temperature is $T_{amb}$ and the eardrum temperature is $T_{env}$. $R[T_{amb}]$ is a function using the ambient temperature. In this model, the heat coefficient may depend on the ambient temperature. To solve for Newton's model the system may perform five steps. First, the system may calibrate $R(T_{amb})$ for some values of ambient temperature, and P. Second, the system may interpolate $R(T_{amb})$ (e.g., by plotting a straight line between at least two points to enable estimating points in between or to the sides of the two points). Third, the system may deduce r by continuously recording the earpiece temperature. Fourth, the system may find $T_{amb}$, such that $R(T_{amb}) = r$, since $T_{amb}$ may be known, and $T_{inferred}$ may be measured (either by waiting some time, or using the above-described time-prediction techniques). Fifth, using the above-described equation, $T_{ear}$ may be determined by solving the following equation for $T_{ear}$, since P may be known, $T_{amb}$ may be known, and $T_{inferred}$ may be known (using prediction): $T_{inferred} = P(T_{amb}, T_{amb})$ Body Temperature Measurement (Second Approach)

In this alternative approach, the computing system calculates the earpiece temperature as described previously, but the earpiece temperature is designated as the ambient temperature due to the earpiece being determined to be located outside of the user's ear and thus influenced primarily by the ambient temperature. (The in-ear-detection technique described with respect to process 700 is used to identify when the earpiece is outside of the ear.) Once the ear piece is determined to be in the ear, the system may be able to determine the user temperature since the ambient temperature is known and the earpiece temperature is known, and the system may have access to previously-performed calibrations that map ear temperature to earpiece temperature for various ambient temperatures. This process is described in more detail with respect to boxes 980-986.

At box 980, the computing system determines whether the earpiece is in the user's ear, for example, using the in-ear-detection process 700. The computing system may regularly perform this process, until the system determines that the earpiece is not in the user's ear, at which point the computing system may perform the operations of box 982 to effectively begin the temperature-measurement process.

At box 982, the computing system may determine the absolute steady-state earpiece temperature, and designate this temperature as the ambient temperature. The determination of the absolute steady-state earpiece temperature may involve performing the operations of boxes 900-940 to calculate the steady-state temperature of the earpiece. In this case, since the earpiece is not in a user's ear, it can be assumed that the earpiece is the same or at least similar to the ambient temperature of the space in which the earpiece is located. As described with respect to box 940, determining the steady-state temperature can involve waiting a determined length of time until the earpiece reaches the ambient temperature (box 942), or can involve using a model to calculate the future steady-state temperature (box 944).

At box 984, the computing system determines whether the earpiece is in the user's ear, for example, using the in-ear-detection process 700. If the earpiece is not determined to be in the user's ear, the system continues determining the absolute steady-state earpiece temperature (box 982). If the system determines that the earpiece is now located in the user's ear, the computing system performs the operations of box 966. In various examples, the computing system continues to record the earpiece temperatures and does not perform the operations of box 982 to determine the steady-state earpiece temperature until the computing system has determined whether the earpiece has transitioned to being in a user's ear. Waiting to determine the ambient temperature allows the computing system to select between simply using the last temperature reading (e.g., because the earpiece has reached steady-state environmental temperature) or using temperature modeling (e.g., because the earpiece temperature was still changing).

At box 986, the computing system calibrates ear temperature versus earpiece temperature for multiple ambient temperatures (e.g., ear temperature versus ambient temperature for multiple earpiece temperatures), as described previously with respect to box 962.

At box 990, the computing system determines the ear temperature using the absolute steady-state earpiece temperature, the determined ambient temperature, and the data that calibrated ear to earpiece to ambient temperatures. For example, the computing system may identify an earpiece temperature from the calibrated data that matches the determined earpiece temperature, then from among multiple ambient temperatures stored for that earpiece temperature, select the ambient temperature that matches the stored ambient temperature, and with these two values already selected, select the corresponding ear temperature from the data set. In some examples, the calibrated data uses interpolation or a similar process where the recorded values are not identical to the calibrated data.

Second Mechanism: Measure Characteristics of Environment

Figure 10:
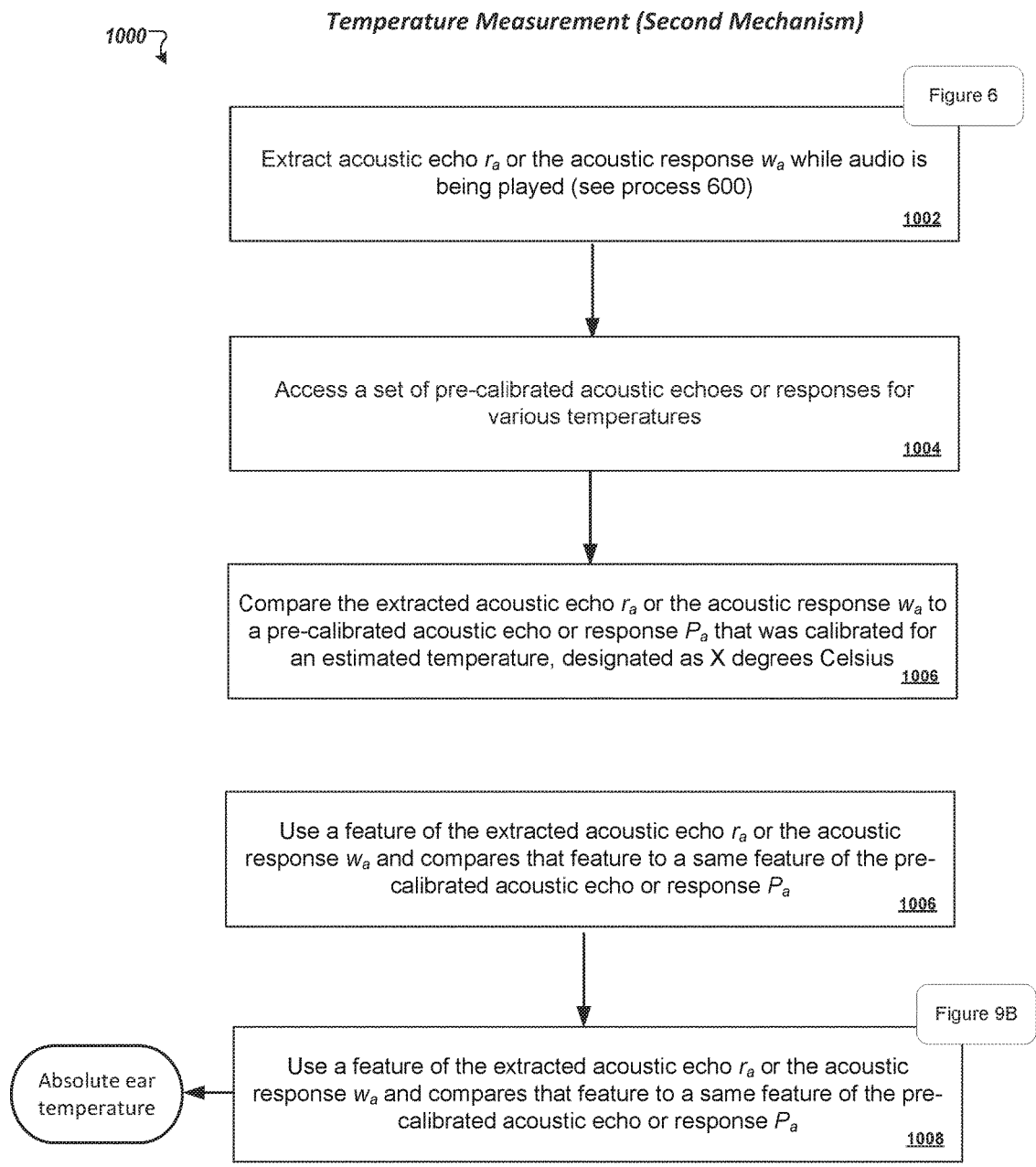
FIG. 10 shows another process for determining the temperature of a user and an environment using a transducer.

As the temperature changes, the acoustic characteristics of an environment in which the earpiece is located may change. For example, temperature can affect the speed of sound in an environment, as well as the amplitude and other characteristics. As such, the acoustic echo $r_a$ and acoustic response $w_a$, which are affected by sound speed and amplitude, may change as the temperature changes. Accordingly, comparing either the acoustic echo $r_a$ or acoustic response $w_a$ to corresponding values that are calibrated for different temperatures, can allow a system to determine the temperature inside a user's ear. This process is described below with respect to process 1000 (FIG. 10) and boxes 1002 through 1008.

At box 1002, the computing system extracts the acoustic echo $r_a$ or the acoustic response $w_a$ while audio is being played, as described previously with respect to process 600.

At box 1004, the computing system accesses a set of pre-calibrated acoustic echoes or responses, where there is at least one pre-calibrated value for each temperature value.

At box 1006, the computing system compares the extracted acoustic echo $r_a$ or the acoustic response $w_a$ to a pre-calibrated acoustic echo or response $P_a$ that was calibrated for an estimated temperature, designated here as X degrees Celsius.

At box 1008, the computing system uses a feature from the extracted acoustic echo $r_a$ or the acoustic response $w_a$ and compares that feature to a same feature of the pre-calibrated acoustic echo or response $P_a$, to identify a matching ear canal temperature. As a first example, the system may extract the time difference between the played and recorded signal, which may be temperature correlated according to the effect of temperature on the speed of sound. As a second example, the system may compare the amplitude of the recorded signal to the amplitude of the played signal. As another example, the system may find the entire impulse response between the played and recorded signal, compare it to the impulse response at X degrees, and use a model of contraction due to the speed of sound. Such mechanisms may be used to determine a relative temperature of the ear.

At box 1010, the computing system converts the determined relative temperature of the ear to an absolute temperature of the ear, for example, by performing the operations of box 920.

Figure 11:
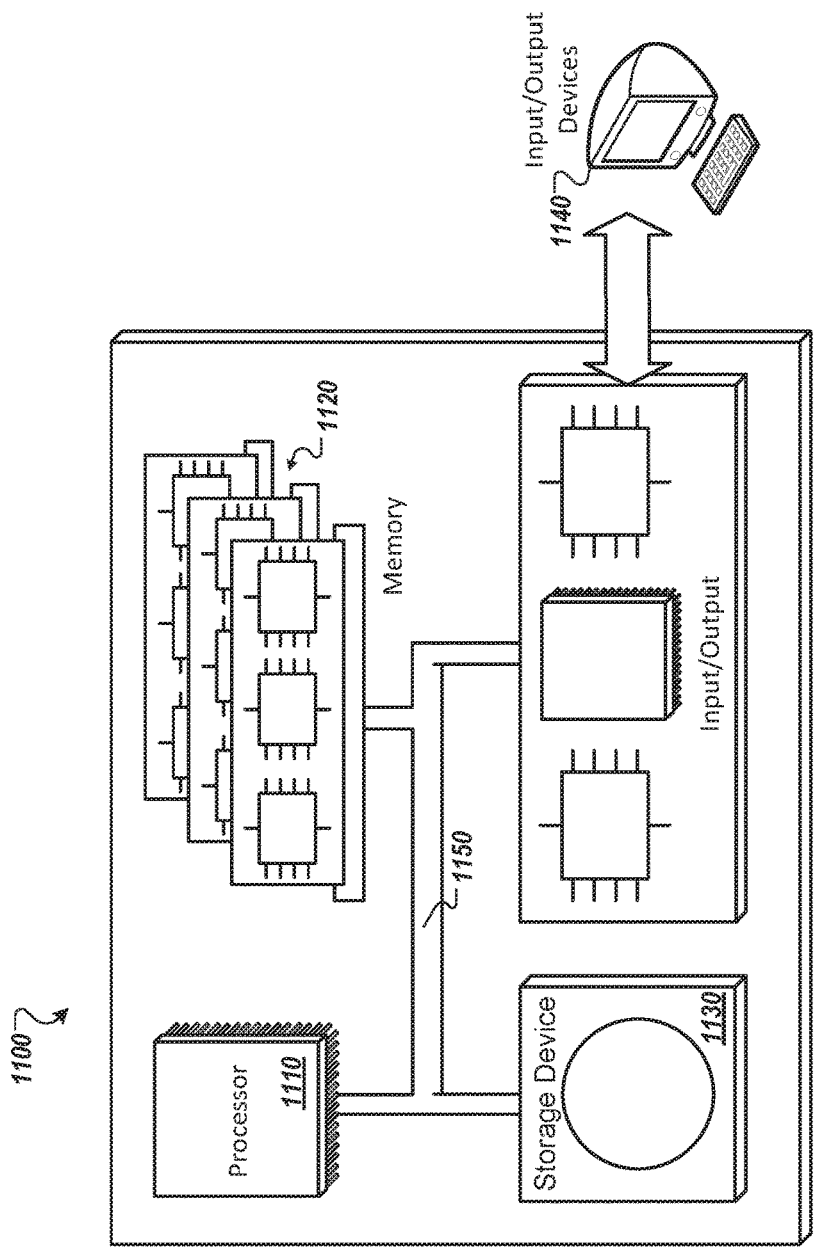
FIG. 11 depicts an example computer that may be configured to carry out the computer-implemented methods and other techniques described herein. In some examples, an audio processing device may include a combination of hardware and software like that discussed with respect to FIG. 2A.

FIG. 11 is a schematic diagram of a computer system 1100. The system 1100 can be used to carry out the operations described in association with any of the computer-implemented methods described previously, according to one implementation. The system 1100 is intended to include various forms of digital computers, such as laptops, desktops, workstations, personal digital assistants, servers, blade servers, mainframes, and other appropriate computers. The system 1100 can also include mobile devices, such as personal digital assistants, cellular telephones, smartphones, and other similar computing devices. Additionally the system can include portable storage media, such as, Universal Serial Bus (USB) flash drives. For example, the USB flash drives may store operating systems and other applications. The USB flash drives can include input/output components, such as a wireless transmitter or USB connector that may be inserted into a USB port of another computing device.

The system 1100 includes a processor 1110, a memory 1120, a storage device 1130, and an input/output device 1140. Each of the components 1110, 1120, 1130, and 1140 are interconnected using a system bus 1150. The processor 1110 is capable of processing instructions for execution within the system 1100. The processor may be designed using any of a number of architectures. For example, the processor 1110 may be a CISC (Complex Instruction Set Computers) processor, a RISC (Reduced Instruction Set Computer) processor, or a MISC (Minimal Instruction Set Computer) processor.

In one implementation, the processor 1110 is a single-threaded processor. In another implementation, the processor 1110 is a multi-threaded processor. The processor 1110 is capable of processing instructions stored in the memory 1120 or on the storage device 1130 to display graphical information for a user interface on the input/output device 1140.

The memory 1120 stores information within the system 1100. In one implementation, the memory 1120 is a computer-readable medium. In one implementation, the memory 1120 is a volatile memory unit. In another implementation, the memory 1120 is a non-volatile memory unit.

The storage device 1130 is capable of providing mass storage for the system 400. In one implementation, the storage device 1130 is a computer-readable medium. In various different implementations, the storage device 1130 may be a floppy disk device, a hard disk device, an optical disk device, or a tape device.

The input/output device 1140 provides input/output operations for the system 400. In one implementation, the input/output device 1140 includes a keyboard and/or pointing device. In another implementation, the input/output device 1140 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer. Additionally, such activities can be implemented via touch-screen flat-panel displays and other appropriate mechanisms.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

The computer system can include clients and servers. A client and server are generally remote from each other and typically interact through a network, such as the described one. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

Pre-Recorded Sounds

Implementation 1 is a computer-implemented method. The method includes playing, with an audio processing device, a source audio signal, including causing the source audio signal to be audibly output by an electroacoustic transducer of a user earpiece. The method further includes recording, with the audio processing device and while playing the source audio signal, an ambient audio signal that indicates sounds present within an environment of the user. The method further includes identifying, based on analysis of the ambient audio signal, that a pre-recorded audio signal occurs in the ambient audio signal. The method further includes accessing a second instance of the pre-recorded audio signal. The method further includes modifying, with the audio processing device and using the stored instance of the pre-recorded audio signal as a representation of the pre-recorded audio signal that occurs in the ambient audio signal, the source audio signal output by the electroacoustic transducer of the user earpiece so as to at least partially remove the pre-recorded audio signal from the source audio signal.

Implementation 2 is the method of implementation 1. The source audio signal comprises an audio signal from at least one of a song or spoken content.

Implementation 3 is the method of implementation 1. The pre-recorded audio signal comprises an audio signal from at least one of a song, spoken content, a movie, or a television show.

Implementation 4 is the method of implementation 1. Identifying that the pre-recorded audio signal occurs in the ambient audio signal comprises: filtering, with the audio processing device, the ambient audio signal to extract the pre-recorded audio signal from the ambient audio signal; and determining that the pre-recorded audio signal extracted from the ambient audio signal matches one of a plurality of different pre-recorded audio signals.

Implementation 5 is the method of implementation 1. Identifying that the pre-recorded audio signal occurs in the ambient audio signal comprises: sending, from the audio processing device and over a network to a server remotely located from the audio processing device, audio data that characterizes at least a portion of the ambient audio signal; and receiving, at the audio processing device as a response to the audio data sent to the server, data that identifies the pre-recorded audio signal.

Implementation 6 is the method of implementation 5. Accessing the stored instance of the pre-recorded audio signal comprises receiving, at the audio processing device as part of the response to the audio data sent to the server, the second instance of the pre-recorded audio signal.

Implementation 7 is the method of any one of implementations 1-6. The method includes determining a current temporal position of the pre-recorded audio signal that occurs in the ambient audio signal; and synchronizing the second instance of the pre-recorded audio signal with the pre-recorded audio signal that occurs in the ambient audio signal based on the determined current temporal position.

Implementation 8 is the method of implementation 7. Modifying the source audio signal so as to at least partially remove the pre-recorded audio signal from the source audio signal comprises filtering the source audio signal in real-time with the synchronized second instance of the pre-recorded audio signal.

Implementation 9 is the method of any one of implementations 1-8. The method comprises identifying that the pre-recorded audio signal no longer occurs in the ambient audio signal; and in response to identifying that the pre-recorded audio signal no longer occurs in the ambient audio signal, ceasing modification of the source audio signal so as to at least partially remove the pre-recorded audio signal from the source audio signal.

Implementation 10 is the method of implementation 9. The method comprises after ceasing modification of the source audio signal: identifying that the pre-recorded audio signal has resumed in the ambient audio signal; and in response to identifying that the pre-recorded audio signal has resumed in the ambient audio signal, resuming modification of the source audio signal so as to at least partially remove the pre-recorded audio signal from the source audio signal.

Implementation 11 is the method of any one of implementations 1-10. Recording the ambient audio signal comprises sensing the ambient audio signal with the electroacoustic transducer of the user earpiece.

Implementation 12 is the method of any one of implementations 1-10. Recording the ambient audio signal comprises sensing the ambient audio signal with a microphone that is external to the user earpiece.

Implementation 13 is the method of implementation 12. The microphone is further external to the audio processing device Implementation 14 is the method of implementation 12. The microphone is an integrated component of the audio processing device.

Implementation 15 is the method of any one of implementations 1-14. Modifying the source audio signal output by the electroacoustic transducer of the user earpiece comprises subtracting the second instance of the pre-recorded audio signal from the source audio signal Implementation 16 is the method of any one of implementations 1-15. The earpiece comprises a headphone or an earbud.

Implementation 17 is the method of any one of implementations 1-16. The audio processing device comprises a portable digital media player, a smartphone, a tablet computing device, a notebook computing device, a desktop computing device, or a wearable computing device.

Implementation 18 is a computing system. The computing system includes one or more processors and one or more computer-readable media. The one or more computer-readable media have instructions stored thereon that, when executed by the one or more processors, cause performance of operations that carry out any of the methods of implementations 1-17.

Implementation 19 is one or more computer-readable media that have instructions stored thereon that, when executed by one or more processors, cause performance of operations that carry out any of the methods of implementations 1-17.

Ear Presence

Implementation 1 is a computer-implemented method. The method includes playing, with an audio processing device, a source audio signal, including causing the source audio signal to be audibly output by an electroacoustic transducer of a user earpiece; recording, with the audio processing device, an aural signal using the electroacoustic transducer of the user earpiece; determining values of one or more features of the aural signal that indicate, as a result of playing the source audio signal, a characteristic of a space in which the user earpiece is located; comparing the determined values of the one or more features of the aural signal with pre-defined values of the one or more features; and based on a result of comparing the determined values of the one or more features of the aural signal with the pre-defined values of the one or more features, determining whether the user earpiece is located at a user's ear.

Implementation 2 is the method of implementation 1. The method comprises determining whether to perform a specified action based on whether the user earpiece is located at the user's ear.

Implementation 3 is the method of implementation 1. The method comprises determining, at a first time, that the user earpiece is located at the user's ear; determining, at a second time after the first time, that the location of the user earpiece is changed from being at the user's ear to not being at the user's ear; and in response to determining that the location of the user earpiece is changed from being at the user's ear to not being at the user's ear, performing a specified action.

Implementation 4 is the method of implementation 1. The method comprises determining, at a first time, that the user earpiece is not located at the user's ear; determining, at a second time after the first time, that the location of the user earpiece is changed from being not at the user's ear to being at the user's ear; and in response to determining that the location of the user earpiece is changed from being not at the user's ear to being at the user's ear, performing a specified action.

Implementation 5 is the method of any one of implementations 2-4. The specified action comprises at least one of playing a media file, pausing the media file, stopping the media file, resuming play of a paused media file, activating an electronic display, adjusting a brightness setting of a backlight of the electronic display, transitioning a device into a locked mode, transitioning a device out of a locked mode, initiating a telephone call, ending a telephone call, launching an application, or closing an application.

Implementation 6 is the method of any one of implementations 1-5. The method comprises repeatedly determining whether the user earpiece is located at the user's ear over a period of time to monitor for a change in location of the user earpiece from (i) not being at the user's ear to being at the user's ear or (ii) from being at the user's ear to not being at the user's ear.

Implementation 7 is the method of any one of implementations 1-6. The method comprises recording the aural signal with the audio processing device concurrently with playing the source audio signal with the audio processing device.

Implementation 8 is the method of any one of implementation 1-6. The electroacoustic transducer of the user earpiece concurrently functions as (i) a speaker that audibly outputs the source audio signal and (ii) a microphone that senses the aural signal while the source audio signal is played.

Implementation 9 is the method of any one of implementations 1-8. The one or more features of the aural signal comprise an impulse response of an acoustic echo of the space in which the user earpiece is located.

Implementation 10 is the method of any one of implementations 1-9. The pre-defined values of the one or more features comprise a model that characterizes a space in the user's ear.

Implementation 11 is the method of any one of implementations 1-10. The pre-defined values of the one or more features are determined based at least in part on previously determined values of the one or more features of aural signals that resulted from playing the source audio signal or another audio signal when the user earpiece was determined to be located at the user's ear.

Implementation 12 is the method of any one of implementations 1-10. The pre-defined values of the one or more features are determined based at least in part on values of the one or more features of aural signals that resulted from playing the source audio signal or another audio signal when the user earpiece was located at the respective ears of one or more users other than the user.

Implementation 13 is the method of any one of implementations 1-12. The earpiece comprises a headphone or an earbud.

Implementation 14 is the method of any one of implementations 1-13. The audio processing device comprises a portable digital media player, a smartphone, a tablet computing device, a notebook computing device, a desktop computing device, or a wearable computing device.

Implementation 15 is the method of any one of implementations 1-14. Playing the source audio signal comprises playing white noise.

Implementation 16 is the method of any one of implementations 1-14. Playing the source audio signal comprises playing a song or spoken content to the user of the audio processing device.

Implementation 17 is the method of any one of implementations 1-16. Playing the source audio signal comprises playing sound having an average frequency that is greater than 20 kiloHertz, such that the played sound is above a normal frequency limit for human hearing.

Implementation 18 is a computing system. The computing system includes one or more processors and one or more computer-readable media. The one or more computer-readable media have instructions stored thereon that, when executed by the one or more processors, cause performance of operations that carry out any of the methods of implementations 1-17.

Implementation 19 is one or more computer-readable media that have instructions stored thereon that, when executed by one or more processors, cause performance of operations that carry out any of the methods of implementations 1-17.

User Authentication

Implementation 1 is a computer-implemented method. The method includes playing, with an audio processing device, a source audio signal, including causing the source audio signal to be audibly output by an electroacoustic transducer of a user earpiece. The method further includes recording, with the audio processing device, an aural signal that is sensed by the electroacoustic transducer of the user earpiece. The method further includes determining values of one or more features of the aural signal that indicate, as a result of playing the source audio signal, a characteristic of a space in which the user earpiece is located. The method further includes generating an acoustic signature for the user based on the values of the one or more features of the aural signal. The method further includes registering the acoustic signature with a user account.

Implementation 2 is the method of implementation 1. The method further includes comprising after registering the acoustic signature with the user account: playing, with the audio processing device, a second source audio signal, including causing the second source audio signal to be audibly output by the electroacoustic transducer of the user earpiece; recording, with the audio processing device, a second aural signal that is sensed by the electroacoustic transducer of the user earpiece; determining values of the one or more features of the second aural signal; determining whether the one or more features of the second aural signal match the acoustic signature that is registered with the user account; and determining, based on whether the one or more features of the second aural signal match the acoustic signature that is registered with the user account, whether to perform a specified action.

Implementation 3 is the method of implementation 2. Determining whether to perform the specified action comprises authenticating a user of the user earpiece based on whether the one or more features of the second aural signal match the acoustic signature that is registered with the user account.

Implementation 4 is the method of implementation 2. The specified action comprises logging into the user account or another account.

Implementation 5 is the method of implementation 2. The method includes determining that the one or more features of the second aural signal match the acoustic signature that is registered with the user account; and in response to determining that the one or more features of the second aural signal match the acoustic signature that is registered with the user account, permitting performance of the specified action.

Implementation 6 is the method of implementation 2. The method includes determining that the one or more features of the second aural signal do not match the acoustic signature that is registered with the user account; and in response to determining that the one or more features of the second aural signal do not match the acoustic signature that is registered with the user account, blocking performance of the specified action.

Implementation 7 is the method of implementation 2. The method includes repeatedly determining values of the one or more features of the second aural signal while the audio processing device is in a first mode associated with the specified action; determining to remain in the first mode of the audio processing device associated with the specified action so long as the values of the one or more features of the second aural signal determined in iterations of the repeatedly determining match the acoustic signature that is registered with the user account.

Implementation 8 is the method of implementation 7. The method further includes determining to transition from the first mode associated with the specified action to a second mode associated with the specified action in response to determining that the values of the one or more features of the second aural signal no longer match the acoustic signature that is registered with the user account.

Implementation 9 is the method of implementation 7. The first mode associated with the specified action comprises being logged into a restricted user account.

Implementation 10 is the method of implementation 8. The first mode associated with the specified action comprises being logged into a restricted user account, wherein the second mode associated with the specified action comprises being logged out of the restricted user account.

Implementation 11 is the method of any one of implementations 1-10. The method comprises correlating the acoustic signature with a first position of the user earpiece at the user's ear.

Implementation 12 is the method of any one of implementations 1-11. The method comprises performing multiple iterations of the steps of playing, recording, determining, and generating so as to generate multiple acoustic signatures for the user; prompting the user to move the user earpiece to a different position at the user's ear for each iteration of the multiple iterations; and correlating at least two of the multiple acoustic signatures for the user with at least two different positions of the user earpiece at the user's ear.

Implementation 13 is the method of any one of implementations 1-12. The method includes recording the aural signal with the audio processing device concurrently with playing the source audio signal with the audio processing device.

Implementation 14 is the method of any one of implementations 1-13. The electroacoustic transducer of the user earpiece concurrently functions as (i) a speaker that audibly outputs the source audio signal and (ii) a microphone that senses the aural signal while the source audio signal is played.

Implementation 15 is the method of any one of implementations 1-14. The one or more features of the aural signal comprise an impulse response of an acoustic echo of the space in which the user earpiece is located.

Implementation 16 is the method of any one of implementations 1-15. The pre-defined values of the one or more features comprise a model that characterizes a space in the user's ear.

Implementation 17 is the method of any one of implementations 1-16. The user earpiece comprises a headphone or an earbud.

Implementation 18 is the method of any one of implementations 1-17. Playing the source audio signal comprises playing white noise.

Implementation 19 is the method of any one of implementations 1-17. Playing the source audio signal comprises playing a song or spoken content to the user of the audio processing device.

Implementation 20 is the method of any one of implementations 1-17. Playing the source audio signal comprises playing sound having an average frequency that is greater than 20 kiloHertz, such that the played sound is above a normal frequency limit for human hearing.

Implementation 21 is a computing system. The computing system includes one or more processors and one or more computer-readable media. The one or more computer-readable media have instructions stored thereon that, when executed by the one or more processors, cause performance of operations that carry out the methods of implementations 1-20.

Implementation 22 is one or more computer-readable media having instructions stored thereon that, when executed by one or more processors, cause performance of operations that carry out the methods of any of implementations 1-20.

Using Acoustic Signatures

Implementation 1 is a computer-implemented method. The method includes playing, with an audio processing device, a source audio signal, including causing the source audio signal to be audibly output by an electroacoustic transducer of a user earpiece. The method further includes recording, with the audio processing device, an aural signal that is sensed by the electroacoustic transducer of the user earpiece. The method further includes determining values of one or more features of the aural signal that indicate, as a result of playing the source audio signal, a characteristic of a space in which the user earpiece is located. The method further includes determining whether the one or more features of the aural signal match one or more acoustic signatures that are registered with a user account. The method further includes determining, based on whether the one or more features of the aural signal match the one or more acoustic signatures that are registered with the user account, whether to perform a specified action.

Implementation 2 is a computing system. The computing system includes one or more processors and one or more computer-readable media. The one or more computer-readable media have instructions stored thereon that, when executed by the one or more processors, cause performance of operations that carry out the method of implementation 1.

Implementation 3 is one or more computer-readable media having instructions stored thereon that, when executed by one or more processors, cause performance of operations that carry out the method of implementation 1.

Configuring Simultaneous Playing and Recording

Implementation 1 is a system to simultaneously play and record audio using a same transducer. The system includes an audio processing circuit that includes an audio output connection, an audio input connection, and a ground connection. The system includes a transducer that includes a first electrical connection and a second electrical connection. The system includes a resistor that is connected between the audio output connection of the audio processing circuit and the audio input connection of the audio processing circuit. The system includes a first electrical conductor between the first electrical connection of the transducer and either the audio output connection of the audio processing circuit or the audio input connection of the audio processing circuit. The system includes a second electrical conductor between the second electrical connection of the transducer and the ground connection of the audio processing circuit. Implementation 2 is the system of implementation 1, wherein the first electrical conductor is a wire, and the second electrical conductor is a wire.

Implementation 3 is the system of implementation 1, wherein: a resistance between the first electrical connection of the transducer and the audio output connection of the audio processing circuit is less than 1 ohm, or the resistance between the first electrical connection of the transducer and the audio input connection of the audio processing circuit is less than 1 ohm.

Implementation 4 is the system of implementation 1, wherein the resistor has a resistance greater than 5 ohms.

Implementation 5 is the system of implementation 1, wherein the resistor has a resistance greater than 50 ohms.

Implementation 6 is the system of implementation 1, further comprising a first circuit element that is configured to switch the resistor that is connected between the audio output connection and the audio input connection so that the resistor is no longer connected between the audio output connection and the audio input connection.

Implementation 7 is the system of implementation 6, comprising the first circuit element or a second circuit element that is configured to connect the first electrical connection of the transducer to the audio output connection of the transducer or the audio input connection of the transducer as a result of the resistor being switched so that it is no longer connected between the audio output connection and the audio input connection.

Implementation 8 is the system of implementation 1, wherein the first electrical conductor is connected between the first electrical connection of the transducer and the audio input connection of the audio processing circuit Implementation 9 is the system of implementation 1, wherein the audio input connection includes a first input connection that is connected to a first side of the resistor and a second input connection that is connected to a second side of the resistor, such that the first input connection and the second input connection are connected across the resistor.

Temperature Measurement Mechanism

Implementation 1 is a computer-implemented method. The method comprises playing, with an audio processing device, a source audio signal, including causing the source audio signal to be audibly output by an electroacoustic transducer of a user earpiece. The method comprises recording, with the audio processing device and while playing the source audio signal, a recorded audio signal using the electroacoustic transducer of the user earpiece. The method comprises identifying, by the audio processing device, one or more parameters that indicate how properties of the user earpiece affect playing of the source audio signal by the electroacoustic transducer, wherein at least one of the one or more parameters is temperature dependent. The method comprises determining, by the audio processing device, a temperature value that is estimated to cause the source audio signal that was played by the audio processing device to result in the recorded audio signal, accounting for changes to the source audio signal that occur due to application of the one or more parameters.

Implementation 2 is the computer-implemented method of implementation 1, wherein the at least one of the one or more parameters is a temperature-dependent impulse response of the user earpiece.

Implementation 3 is the computer-implemented method of implementation 1, wherein the at least one of the one or more parameters is a temperature-dependent frequency response of the user earpiece.

Implementation 4 is the computer-implemented method of implementation 1, wherein the temperature value represents a relative temperature value of the transducer. The method further comprises modifying the temperature value using an offset constant and a scaling constant to generate an absolute temperature value of the user earpiece, wherein the offset constant and the scaling constant are values that were calibrated for the user earpiece or a type of the user earpiece.

Implementation 5 is the computer-implemented method of implementation 1, wherein the temperature value represents a temperature value of the transducer. The method further comprises estimating, using the determined temperature value, an environmental temperature value of an environment in which the user earpiece is located by identifying a temperature of the user earpiece at a future time using a model that represents earpiece temperature-change characteristics over time.

Implementation 6 is the computer-implemented method of implementation 1, wherein the temperature value represents a temperature value of the transducer. The method further comprises estimating, using the determined temperature value and an environmental temperature value of an environment in which the user earpiece is located, a user body temperature value of a user body to which the user earpiece is adjacent and touching by correlating the user body temperature value to previously-calibrated sets of user body temperature, user earpiece temperature, and environmental temperature that correlate to each other.

Implementation 7 is the computer-implemented method of implementation 1. The method further comprises determining, by the audio processing device, that the user earpiece is not located in a user ear, wherein the playing of the source audio signal and the recording of the recorded audio signal occur while the audio processing device has determined that the user earpiece is not located in the user ear, such that the determined temperature value is designated as an environmental temperature value.

Implementation 8 is the computer-implemented method of implementation 7. The method further comprises determining, by the audio processing device and after the user earpiece has been determined to not be located in the user ear, that the user earpiece is now located in a user ear, and in response: (i) playing, with the audio processing device, a second source audio signal using the electroacoustic transducer, (ii) recording, with the audio processing device and while playing the second source audio signal, a second recorded audio signal, and (iii) determining, by the audio processing device, a second temperature value that is estimated to cause the second source audio signal that was played by the audio processing device to result in the second recorded audio signal, accounting for changes to the second source audio signal that occur due to application of one or more parameters, wherein the second temperature value differs from the determined temperature value that is designated as the environmental temperature value because temperature of the earpiece has changed after the earpiece was placed in the user ear. The method further comprises estimating, by the audio processing device, a user body temperature value using the determined temperature value that is designated as the environmental temperature value and the second temperature value.

Implementation 9 is the computer-implemented method of implementation 8, wherein estimating the user body temperature using the determined temperature value and the second temperature value includes correlating the user body temperature to previously-calibrated sets of user body temperature, user earpiece temperature, and environmental temperature that correlate to each other.

Implementation 10 is a computing system comprising: one or more processors; and one or more computer-readable media having instructions stored thereon that, when executed by the one or more processors, cause performance of operations that carry out any of the method of claims 1-9.

Implementation 11 is one or more computer-readable media having instructions stored thereon that, when executed by one or more processors, cause performance of operations that carry out any of the methods of claims 1-9.

Another Temperature Measurement Mechanism

Implementation 1 is a computer-implemented method. The method comprises playing, with an audio processing device, a source audio signal, including causing the source audio signal to be audibly output by an electroacoustic transducer of a user earpiece. The method comprises recording, with the audio processing device and while playing the source audio signal, a recorded audio signal using the electroacoustic transducer of the user earpiece. The method comprises identifying, by the audio processing device, one or more parameters that indicate how properties of the earpiece affect playing of the source audio signal by the electroacoustic transducer. The method comprises determining, by the audio processing device, a parameter that indicates how properties of the user ear environment at which the user earpiece is located affects the source audio signal that was played by the audio processing device, accounting for changes to the source audio signal that occur due to application of the one or more parameters that indicate how properties of the earpiece affect playing of the source audio signal. The method comprises using, by the audio processing device, the parameter that indicates how the properties of the user ear affects the source audio signal to determine a temperature value.

Implementation 2 is the computer-implemented method of implementation 1, wherein the temperature value represents a relative temperature value of the user ear environment. The method further comprises modifying the temperature value using an offset constant and a scaling constant to generate an absolute temperature value of the user ear environment, wherein the offset constant and the scaling constant are values that were calibrated for the user earpiece or a type of the user earpiece.

Implementation 3 is a computing system comprising one or more processors; and one or more computer-readable media having instructions stored thereon that, when executed by the one or more processors, cause performance of operations that carry out any of the method of implementations 1-2.

Implementation 4 is one or more computer-readable media having instructions stored thereon that, when executed by one or more processors, cause performance of operations that carry out any of the methods of implementations 1-2.

In some implementations, the audio processing device may be configured to perform various combinations of the techniques described herein, including two or more of the in-ear detection techniques, active-noise cancellation with pre-recorded sounds techniques, and aural-based authentication techniques.

In some implementations, the techniques described herein may be performed using wireless earpieces that are communicably coupled with a computing device via a wireless connection (e.g., BLUETOOTH). For example, the wireless earpieces may digitally sample recorded sounds and either process the sounds locally at the headset or transmit the recorded signal to a separate audio processing device to perform, e.g., aural-based authentication, in-ear detection, and/or active-noise cancellation with pre-recorded sounds.

What is claimed is:

1. A computer-implemented method, comprising:
    playing, with an audio processing device, a source audio signal, including causing the source audio signal to be audibly output by an electroacoustic transducer of a user earpiece;
    recording, with the audio processing device, an aural signal using same said electroacoustic transducer of the user earpiece concurrent with the playing of the source audio signal by the electroacoustic transducer;
    determining values of one or more features of the aural signal that indicate, as a result of playing the source audio signal, a characteristic of a space in which the user earpiece is located;
    comparing the determined values of the one or more features of the aural signal with defined values; and
    based on a result of comparing the determined values of the one or more features of the aural signal with the defined values, determining whether the user earpiece is located at a user's ear.

2. The computer-implemented method of claim 1, further comprising determining whether to perform a specified action based on whether the user earpiece is located at the user's ear.

3. The computer-implemented method of claim 1, further comprising:
    determining, at a first time, that the user earpiece is located at the user's ear;
    determining, at a second time after the first time, that the location of the user earpiece is changed from being at the user's ear to not being at the user's ear; and
    in response to determining that the location of the user earpiece is changed from being at the user's ear to not being at the user's ear, performing a specified action.

4. The computer-implemented method of claim 3, wherein the specified action comprises at least one of playing a media file, pausing the media file, stopping the media file, resuming play of a paused media file, activating an electronic display, adjusting a brightness setting of a backlight of the electronic display, transitioning a device into a locked mode, transitioning a device out of a locked mode, initiating a telephone call, ending a telephone call, launching an application, or closing an application.

5. The computer-implemented method of claim 1, further comprising:
   determining, at a first time, that the user earpiece is not located at the user's ear;
   determining, at a second time after the first time, that the location of the user earpiece is changed from being not at the user's ear to being at the user's ear; and
   in response to determining that the location of the user earpiece is changed from being not at the user's ear to being at the user's ear, performing a specified action.

6. The computer-implemented method of claim 5, wherein the specified action comprises at least one of playing a media file, pausing the media file, stopping the media file, resuming play of a paused media file, activating an electronic display, adjusting a brightness setting of a backlight of the electronic display, transitioning a device into a locked mode, transitioning a device out of a locked mode, initiating a telephone call, ending a telephone call, launching an application, or closing an application.

7. The computer-implemented method of claim 1, further comprising repeatedly determining whether the user earpiece is located at the user's ear over a period of time to monitor for a change in location of the user earpiece from (i) not being at the user's ear to being at the user's ear or (ii) from being at the user's ear to not being at the user's ear.

8. The computer-implemented method of claim 1, wherein the one or more features of the aural signal comprise an impulse response of an acoustic echo of the space in which the user earpiece is located.

9. The computer-implemented method of claim 1, wherein the defined values comprise a model that characterizes a space in the user's ear.

10. The computer-implemented method of claim 1, wherein the defined values are determined based at least in part on previously determined values of the one or more features of aural signals that resulted from playing the source audio signal or another audio signal when the user earpiece was determined to be located at the user's ear.

11. The computer-implemented method of claim 1, wherein the defined values are determined based at least in part on values of the one or more features of aural signals that resulted from playing the source audio signal or another audio signal when the user earpiece was located at the respective ears of one or more users other than the user.

12. The computer-implemented method of claim 1, wherein the earpiece comprises a headphone or an earbud.

13. The computer-implemented method of claim 1, wherein the audio processing device comprises a portable digital media player, a smartphone, a tablet computing device, a notebook computing device, a desktop computing device, or a wearable computing device.

14. The computer-implemented method of claim 1, wherein playing the source audio signal comprises playing white noise.

15. The computer-implemented method of claim 1, wherein playing the source audio signal comprises playing a song or spoken content to the user of the audio processing device.

16. The computer-implemented method of claim 1, wherein playing the source audio signal comprises playing sound having an average frequency that is greater than 20 kilohertz, such that the played sound is above a normal frequency limit for human hearing.

17. The computer-implemented method of claim 1, wherein determining the values of the one or more features of the aural signal that indicate the characteristic of the space in which the user earpiece is located includes determining the values based on a change between said source audio signal that is audibly output by the electroacoustic transducer and the aural signal that is concurrently recorded using same said electroacoustic transducer.

18. A computing system, comprising:
   one or more processors; and
   one or more computer-readable media having instructions stored thereon that, when executed by the one or more processors, cause performance of operations that comprise:
      playing, with an audio processing device, a source audio signal, including causing the source audio signal to be audibly output by an electroacoustic transducer of a user earpiece;
      recording, with the audio processing device, an aural signal using same said electroacoustic transducer of the user earpiece concurrent with the playing of the source audio signal by the electroacoustic transducer;
      determining values of one or more features of the aural signal that indicate, as a result of playing the source audio signal, a characteristic of a space in which the user earpiece is located;
      comparing the determined values of the one or more features of the aural signal with defined values; and
      based on a result of comparing the determined values of the one or more features of the aural signal with the defined values, determining whether the user earpiece is located at a user's ear.

19. One or more non-transitory computer-readable media that have instructions stored thereon that, when executed by one or more processors, cause performance of operations that comprise:
   playing, with an audio processing device, a source audio signal, including causing the source audio signal to be audibly output by an electroacoustic transducer of a user earpiece;
   recording, with the audio processing device, an aural signal using same said electroacoustic transducer of the user earpiece concurrent with the playing of the source audio signal by the electroacoustic transducer;
   determining values of one or more features of the aural signal that indicate, as a result of playing the source audio signal, a characteristic of a space in which the user earpiece is located;
   comparing the determined values of the one or more features of the aural signal with defined values; and
   based on a result of comparing the determined values of the one or more features of the aural signal with the defined values, determining whether the user earpiece is located at a user's ear.

* * * * *